(12) United States Patent
Juvet et al.

(10) Patent No.: US 10,506,102 B2
(45) Date of Patent: *Dec. 10, 2019

(54) VOICE MESSAGING AND CALLING SYSTEM FOR INMATES

(71) Applicant: CORRIO, SPC, Bellevue, WA (US)

(72) Inventors: Eric Juvet, Seattle, WA (US); Sam Baker, Seattle, WA (US); Alex Peder, Bellevue, WA (US)

(73) Assignee: CORRIO, SPC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,327

(22) Filed: Apr. 23, 2019

(65) Prior Publication Data

US 2019/0306313 A1 Oct. 3, 2019

Related U.S. Application Data

(63) Continuation of application No. 16/054,525, filed on Aug. 3, 2018, now Pat. No. 10,313,518.

(60) Provisional application No. 62/540,969, filed on Aug. 3, 2017.

(51) Int. Cl.
*H04M 1/64* (2006.01)
*H04M 3/493* (2006.01)
*H04L 12/58* (2006.01)
*H04L 29/06* (2006.01)
*H04M 3/42* (2006.01)

(52) U.S. Cl.
CPC ............ *H04M 3/493* (2013.01); *H04L 51/06* (2013.01); *H04L 65/1006* (2013.01); *H04L 69/22* (2013.01); *H04M 3/42221* (2013.01)

(58) Field of Classification Search
CPC ..... H04L 51/06; H04L 65/1006; H04L 69/22; H04M 1/64; H04M 3/42221; H04M 3/493
USPC ............................... 379/88.22, 88.26, 88.27
See application file for complete search history.

(56) References Cited

U.S. PATENT DOCUMENTS

| | | | |
|---|---|---|---|
| 6,665,380 B1 * | 12/2003 | Cree ..................... | H04M 3/533 379/265.01 |
| 7,529,357 B1 * | 5/2009 | Rae ........................ | H04M 3/38 370/261 |
| 7,805,457 B1 * | 9/2010 | Viola ..................... | G06Q 50/26 707/769 |

(Continued)

*Primary Examiner* — Harry S Hong
(74) *Attorney, Agent, or Firm* — Lowe Graham Jones PLLC

(57) ABSTRACT

Disclosed is a voice messaging and calling system for inmates and their friends and family (collectively referred to as "outsiders"). It extends existing inmate telephone systems ("ITS") without requiring any additional installation within correctional facilities or modifications to the existing ITS. An existing ITS provides functional restrictions, security restrictions and privacy limitations. The described system enhances the existing ITS to reduce the functional restrictions by adding the ability to leave voicemail messages when outsiders are unavailable and return calls to, or leave messages for, multiple outsiders in a single call. An additional enhancement allows outsiders to leave messages for the inmate at any time, which the inmate can listen to later. The security restrictions and privacy limitations are unaffected and left in place. The described system also reduces costs for inmates by allowing them to leave messages for and return calls to, multiple outsiders in a single call.

20 Claims, 13 Drawing Sheets

(56) References Cited

U.S. PATENT DOCUMENTS

| | | | |
|---|---|---|---|
| 9,300,798 B1* | 3/2016 | Welker-Muraguri | ........................ H04M 3/493 |
| 10,084,920 B1* | 9/2018 | Gainsboro | .......... H04M 3/2281 |
| 10,313,518 B1* | 6/2019 | Juvet | ..................... H04M 3/493 |
| 2003/0198325 A1* | 10/2003 | Bayne | ................... H04M 15/08 379/114.21 |
| 2006/0256940 A1* | 11/2006 | Pekarovic | .............. H04M 3/533 379/88.26 |
| 2010/0189228 A1* | 7/2010 | Seyfetdinov | ............ H04M 3/42 379/88.14 |
| 2014/0219432 A1* | 8/2014 | Bengston | ............ H04M 3/2281 379/196 |
| 2014/0334610 A1* | 11/2014 | Hangsleben | ........ H04M 3/2218 379/32.01 |
| 2018/0097942 A1* | 4/2018 | Hodge | ................... H04M 15/41 |
| 2018/0352076 A1* | 12/2018 | Chang | ................. H04M 3/2281 |
| 2018/0352077 A1* | 12/2018 | Chang | ................. H04M 3/2281 |
| 2019/0149655 A1* | 5/2019 | Hodge | ................ H04M 3/2281 |

* cited by examiner

VOICE MESSAGING AND CALLING SYSTEM FOR INMATES

CROSS REFERENCE TO RELATED APPLICATION

This application is a continuation of U.S. patent application Ser. No. 16/054,525, filed Aug. 3, 2018, which claims priority to U.S. Provisional Patent Application Ser. No. 62/540,969, filed Aug. 3, 2017, the contents of each which are hereby incorporated by reference in entirety.

FIELD OF THE INVENTION

The present invention relates to dynamically connecting inmates and non-inmates, such as through a voice messaging and calling system.

BACKGROUND OF THE INVENTION

When an inmate makes a telephone call from a facility, the call must be answered by a person who chooses to accept the call, typically by dialing a single digit in response to voice prompts. This restriction means that inmates are able to contact outside people only if the inmates' and outsiders' schedules coincide. If a voicemail system or answering machine picks up the incoming call, the call is not accepted, and the inmate has no way to leave a message.

Inmate telephones are shared, and access is usually limited. If inmates are waiting in lines to make calls, an inmate may not be able to try repeatedly to complete a call, waiting for a family member to be in a position to answer the call. Outsiders are unable to make calls to inmates, so, if the outsiders are busy working and the inmate doesn't have access to the outsiders' schedules, the chances of the inmate calling at the right time are limited.

However, contact with friends and family members is an incredibly important part of rehabilitation and reduced recidivism for inmates. There is a direct relationship between access to communication with family and the likelihood of returning to jail for new crimes after release. Families also benefit from regular communication—children of inmates in particular.

The telephones that inmates use are customized for use in correctional facilities. As well as requiring consent from the recipient of a call, the calls are recorded for review by corrections staff, and the numbers that can be called by the inmate are restricted. Changing the ways that these phone systems work or installing additional hardware is expensive and requires cooperation by various contracted organizations. Nonetheless, those who have sought to improve upon the inmate calling experience have focused on the telephone systems in place at the correctional facilities rather than recognizing the possibility of keeping such systems in place and improving upon the experience from the outside.

A practical solution to improve communication for inmates and their families is a system using the existing telephones in facilities with the same security restrictions that are in place, but adding new services such as the ability to make multiple calls in a single connection and to leave messages for people who are unable to answer the phone. Allowing outsiders to call and leave messages for inmates at any time, also greatly eases communication between the two parties.

SUMMARY OF THE INVENTION

Various embodiments are directed to a communication processing system that comprises a computer system. In some examples, the communication processing system comprises a computer system having a processor. Preferably, the computer system is communicatively coupled to a telephone system and configured to receive incoming telephone calls. In some examples, the communication processing system comprises a memory communicatively coupled to the processor. Preferably, the memory stores instructions that, when executed by the processor, cause the processor to perform one or more actions. Other embodiments are directed to a method. In some embodiments, a telephone number is associated with an inmate at a correctional facility. Preferably, a first incoming communication from a first source directed to the telephone number is detected. In some examples, the first incoming communication has header information. In some examples, the first incoming communication has body information. Preferably, the first source of the first incoming communication is determined to be the correctional facility based on one or more portions of the header information or the body information of the first incoming communication. In some examples, a protocol employed by the correctional facility is determined based on one or more portions of the header information or the body information of the first incoming communication. In some embodiments, an audible signal is transmitted to the first source of the first incoming communication to accept the first incoming communication. In some examples, the audible signal is selected based on the determined protocol. Preferably, a message from the inmate to a non-inmate via the accepted first incoming communication is obtained. In some examples, a notification of the obtained message is transmitted to a client device of the non-inmate.

Preferably, a second incoming communication from a second source directed to the telephone number is detected. In some examples, the second incoming communication has header information. In some embodiments, the second source of the second incoming communication is determined to be the non-inmate. In some examples, the obtained message from the inmate is provided to the non-inmate via the second incoming communication.

Preferably, a second incoming communication from a second source directed to the telephone number is detected. In some examples, the second incoming communication has header information. In some embodiments, the second source of the second incoming communication is determined to be another non-inmate. In some examples, a message from the other non-inmate to the inmate is obtained via the second incoming communication. In some embodiments, the obtained message from the other non-inmate is provided to the inmate via the first incoming communication.

Preferably, the inmate is connected to a client device of another non-inmate via the first incoming communication.

Preferably, determining a protocol employed by the correctional facility comprises further actions. In some examples, a second incoming communication directed to the telephone number is detected before detecting the first incoming communication. In some embodiments, the second incoming communication having header information. In some examples, the second incoming communication is answered. In some embodiments, one or more portions of audio obtained in the second incoming communication are recorded to discover the protocol employed by the correctional facility based on evaluation of the one or more recorded portions of obtained audio. In some examples, one or more data objects are generated or modified to indicate that the correctional facility employs the discovered protocol.

Preferably, a second incoming communication from a second source directed to the telephone number is detected. In some examples, the second incoming communication has header information. In some embodiments, the header information of the second incoming communication is evaluated to determine that the second source is associated with a mobile carrier. In some examples, the second source is determined to be a non-correctional facility source based on the determination that the second source is associated with a mobile carrier. In some embodiments, a message from the non-correctional facility source to the inmate is obtained via the second incoming communication based on the determination that the second source is the non-correctional facility source.

Preferably, a second incoming communication from a second source directed to the telephone number is detected. In some examples, the second incoming communication has header information. In some embodiments, the header information of the second incoming communication is evaluated to determine that the second source has a telephone number that is different than a telephone number of the correctional facility. In some examples, the second source is determined to be a non-correctional facility source based on the determination that the second source has the telephone number that is different than the telephone number of the correctional facility. In some embodiments, a message from the non-correctional facility source to the inmate is obtained via the second incoming communication based on the determination that the second source is the non-correctional facility source.

Preferably, the audible signal includes an audible tone.

Preferably, transmission of the notification of the obtained message to the client device of the non-inmate includes transmission of a uniform resource identifier ("URI") to the client device of the non-inmate. In some examples, the URI identifies a file generated based on the obtained message. In some embodiments, the URI provides the non-inmate access to the file to facilitate the non-inmate consuming content in the obtained message.

Preferably, one or more portions of the body information of the first incoming communication are evaluated to determine that the one or more evaluated portions of the body information of the first incoming communication include automated body information. In some versions, the determination that the first source of the first incoming communication is the correctional facility is based on the one or more evaluated portions of the body information of the first incoming communication that include automated body information. In some versions, the determination of the protocol employed by the correctional facility is based on the one or more evaluated portions of the body information of the first incoming communication that include automated body information. In some versions, one or both of the determination that the first source of the first incoming communication is the correctional facility or the determination of the protocol employed by the correctional facility is based on one or more portions of both the header information and the body information of the first incoming communication.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The following briefly describes example embodiments of the invention to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed to dynamically connecting one or more inmates to one or more outsiders (for example, non-inmate civilians that are located remotely from one or more correctional facilities that house the one or more inmates). The described processes and systems allow inmates and outsiders to leave messages for each other, with no changes required to the inmate telephone system ("ITS") infrastructure at the one or more correctional facilities. Each inmate is provided with his or her own telephone number. When an inmate calls the inmate's number through the ITS, the processes and systems automatically accept the call so that the inmate can access voice prompts via an interactive voice response ("IVR") system. By navigating the IVR system, the inmate can listen to messages, record and send replies to those messages, or return calls to people who have previously left the inmate messages. When an outsider calls the inmate's telephone number, the outsider gets different IVR prompts that allow the outsider to listen to messages left for the outsider by the inmate or to leave messages for the inmate.

Figure 1:
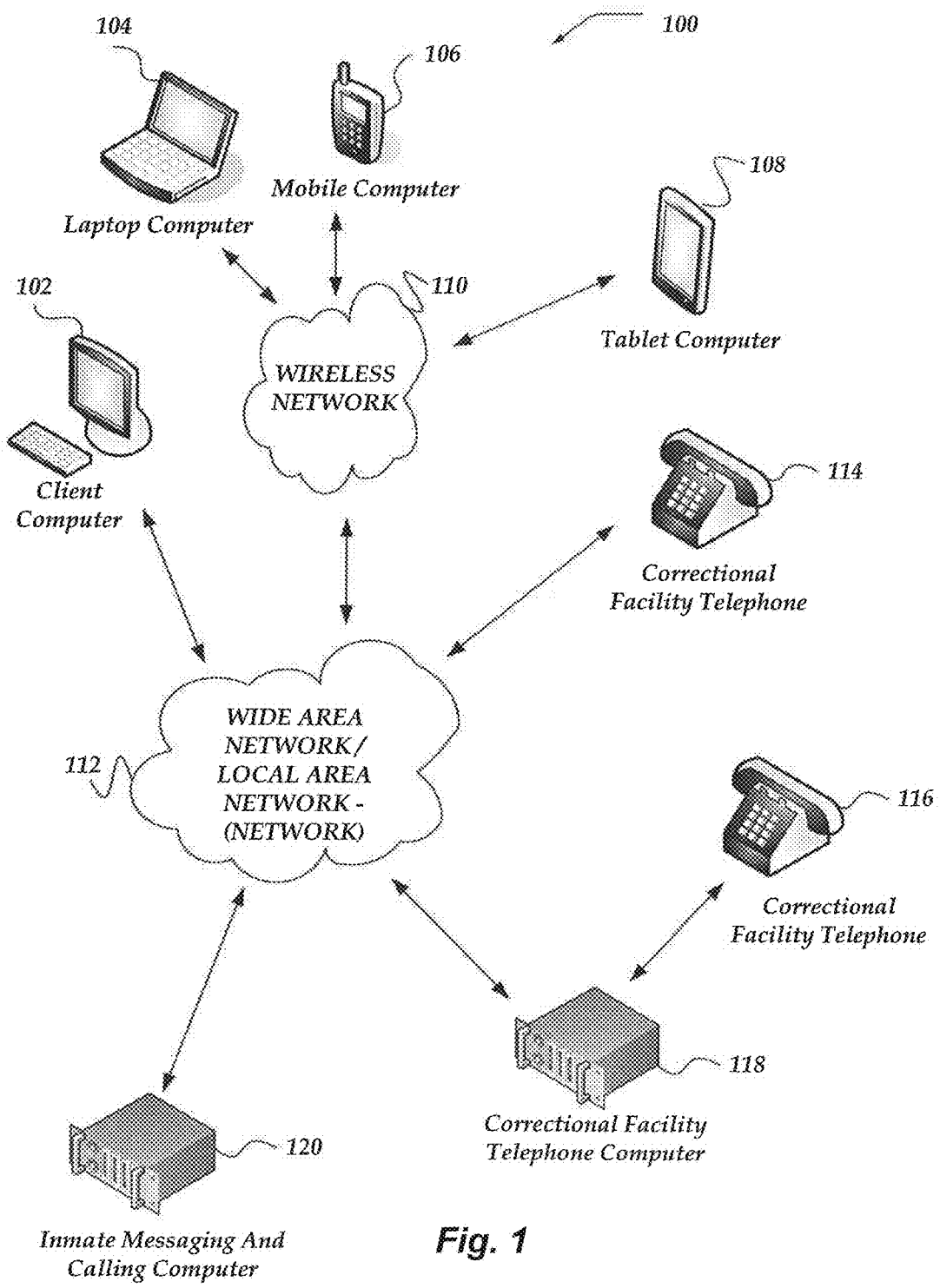
FIG. 1 illustrates a schematic representation of an example system environment in which various embodiments may be implemented.

FIG. 1 shows components of an example environment in which embodiments of the invention may be practiced. Not all of the components may be required to practice the invention, and variations in the arrangement and type of the components may be made without departing from the spirit or scope of the invention. As shown, system 100 of FIG. 1 includes client computers 102-108, wireless network 110, local area networks ("LANs")/wide area networks ("WANs")–(network) 112, correctional facility telephones 114 and 116, correctional facility telephone computer 118, inmate messaging and calling computer 120, or others. In one embodiment, some of client computers 102-108 may operate over one or more wired or wireless networks, such as networks 110 or 112.

Computers that may operate as client computer 102 include computers that typically connect using a wired or wireless communications medium such as personal computers, multiprocessor systems, microprocessor-based or programmable electronic devices, network PCs, or others. In some embodiments, client computers 102-108 include virtually any portable computer capable of connecting to another computer and receiving information, such as laptop computer 104, mobile computer 106, tablet computer 108, or others. However, portable computers preferably also include other portable computers such as cellular telephones, display pagers, radio frequency ("RF") devices, infrared ("IR") devices, Personal Digital Assistants ("PDAs"), handheld computers, wearable computers, integrated devices combining one or more of the preceding computers, or others.

Client computers 102-108 also preferably include one or more other client applications that are configured to receive or send content between another computer. In some examples, the client application includes a capability to send or receive content or other information or signals. The client application preferably further provide information that identifies itself, including a type, capability, name, or others. In some embodiments, client computers 102-108 uniquely identify themselves through any of a variety of mechanisms, including an Internet Protocol ("IP") address, a telephone number, Mobile Identification Number ("MIN"), an electronic serial number ("ESN"), a client certificate, or other device identifier. Such information is preferably provided in one or more network packets or other collections of data, sent between other client computers, correctional facility telephone computer 118, inmate messaging and calling computer 120, or other computers.

Wireless network 110 is configured to couple client computers 104-108 and its components with network 112. Wireless network 110 preferably includes any of a variety of wireless sub-networks that may further overlay stand-alone ad-hoc networks or others to provide an infrastructure-oriented connection for client computers 104-108. In some examples, such sub-networks include mesh networks, Wireless LANs ("WLANs"), cellular networks, or others. In one embodiment, the system includes more than one wireless network.

Wireless network 110 preferably further includes an autonomous system of terminals, gateways, routers, or others connected by wireless radio links or others. These connectors may be configured to move freely and randomly and organize themselves arbitrarily, such that the topology of wireless network 110 may change rapidly.

Wireless network 110 preferably further employ a plurality of access technologies including 2nd ("2G"), 3rd ("3G"), 4th ("4G"), or 5th ("5G") generation radio access for cellular systems, WLAN, Wireless Router ("WR") mesh, or others. Access technologies such as 2G, 3G, 4G, 5G, and future access networks typically enable wide area coverage for mobile computers, such as client computers 104-108 with various degrees of mobility. In some examples, wireless network 110 enables a radio connection through a radio network access such as Global System for Mobile communication ("GSM"), General Packet Radio Services ("GPRS"), Enhanced Data GSM Evolution ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and others. In essence, wireless network 110 preferably includes virtually any wireless communication mechanism by which information may travel between client computers 104-108 and another computer, network, a cloud-based network, a cloud instance, or others.

Network 112 is configured to couple network computers with other computers, including, correctional facility telephone 114, correctional facility telephone computer 118, inmate messaging and calling computer 120, client computer 102, client computers 104-108 through wireless network 110, or others. Network 112 is enabled to employ any form of computer readable media for communicating information from one electronic device to another. Also, network 112 can include the Internet in addition to local area networks ("LANs"), wide area networks ("WANs"), direct connections, such as through a universal serial bus ("USB") port, Ethernet port, or other forms of computer-readable media. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including, for example, DS-0, DS-1, DS-2, DS-3, DS-4, OC-3, OC-12, OC-48, or others. Furthermore, remote computers and other related electronic devices could be remotely connected to either LANs or WANs via a modem and temporary telephone link. In one embodiment, network 112 is configured to transport information of an Internet Protocol ("IP").

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, or other wireless media.

Although FIG. 1 illustrates each of correctional facility telephone computer 118 and inmate messaging and calling computer 120 as a single computer, the innovations or embodiments are not so limited. For example, one or more functions of facility telephone computer 118, inmate messaging and calling computer 120, or others may be distributed across one or more distinct network computers. Moreover, in one or more embodiments, inmate messaging and calling computer 120 are implemented using a plurality of network computers. Further, in one or more of the various embodiments, facility telephone computer 118 or inmate messaging and calling computer 120 are implemented using one or more cloud instances in one or more cloud networks. Accordingly, these innovations and embodiments are not to be construed as being limited to a single environment, and other configurations and other architectures are also envisaged.

Figure 2:
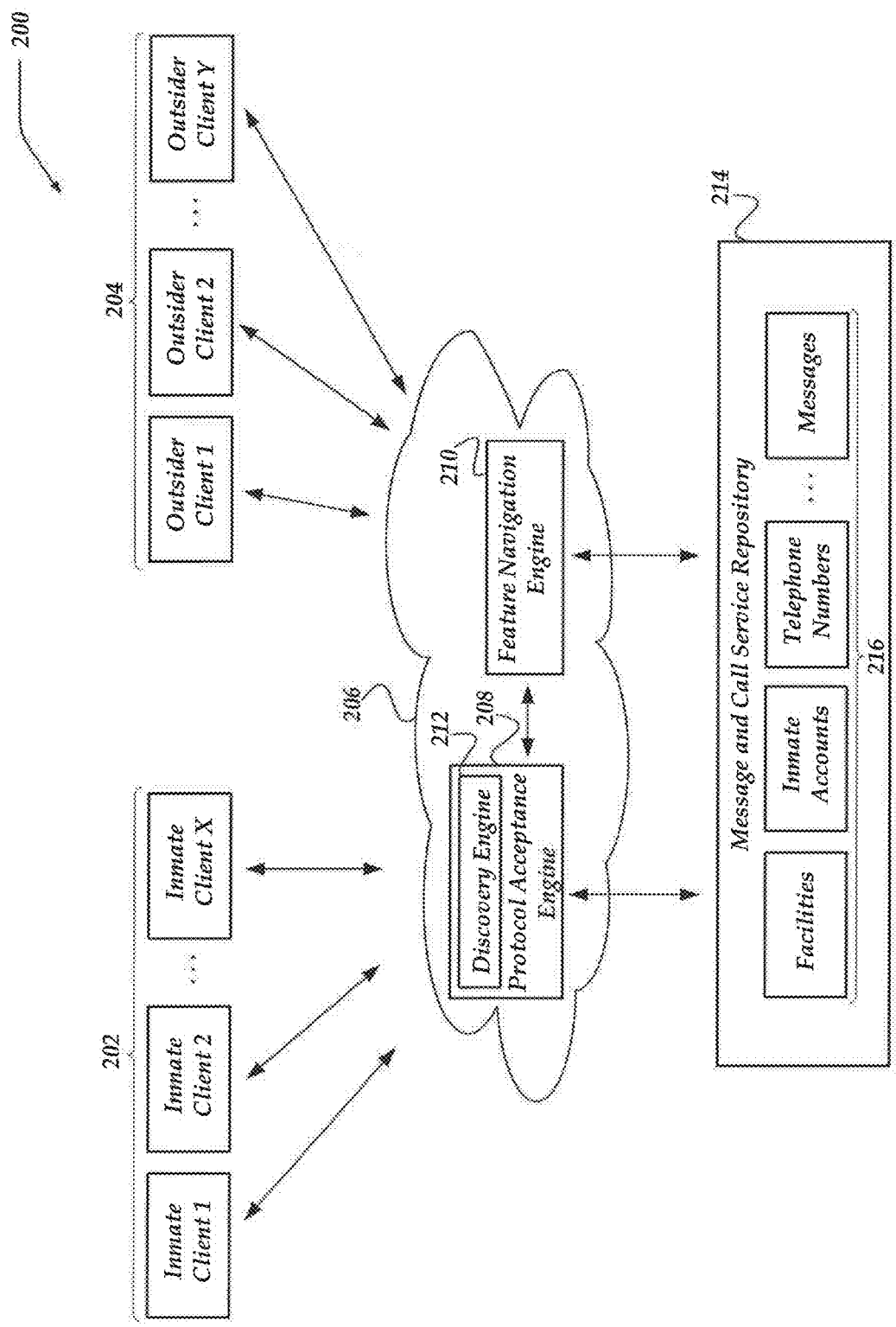
FIG. 2 shows a logical architecture of an example system for dynamically connecting inmates and outsiders.

FIG. 2 shows a logical architecture of example system 200 for dynamically connecting inmates and outsiders. System 200 may be arranged to include one or more inmate clients or outsider clients, such as inmate clients 202 or outsider clients 204. Each of the one or more inmate clients or outsider clients may include or be associated with one or more client computers, such as one or more of client computers 102-108 or others. System 200 may also be arranged to include one or more inmate messaging and calling computers, such as inmate messaging and calling computer 206 (represented in the example shown in FIG. 2 as a cloud-computing environment). Each of the one or more inmate messaging and calling computers may include a network computer, such as inmate messaging and calling computer 120 or others.

Inmate messaging and calling computer 206 may include one or more engines, such as protocol acceptance engine 208, feature navigation engine 210, or others. In some embodiments, one or more discovery engines 212 may be part of or otherwise associated with protocol acceptance engine 208. In some examples, the engines described in this disclosure include one or more libraries, software development kits ("SDKs"), objects, or others.

Preferably, the engines include or execute one or more rules to perform one or more associated actions. The one or more rules preferably include one or more predetermined rules or learned rules. In some examples, predetermined rules are defined by one or more files or configuration scripts, and learned rules are defined by one or more artificial intelligence ("AI") algorithms (for example, one or more machine learning algorithms or others) that inmate messaging and calling computer 206 employs to discover the learned rules based on evaluation of one or more portions of training information. Training information preferably includes information that is the same as or similar to information described in this disclosure where inmate messaging and calling computer 206 knows what the result of executing the one or more rules against the information should be. One or more of the engines in inmate messaging and calling computer 206 may communicate with one or more message service repositories, such as message and call service repository 214. Each message and call service repository may include one or more message service data stores, such as message service data stores 416.

In the example embodiments of this disclosure, various engines perform particular functions, processes, or actions. In other embodiments, the functions, processes, or actions of system 200 are distributed or aggregated in different arrangements of one or more engines. For example, a single engine of messaging and calling computer 206 may perform each of the functions, processes, or actions, instead of three engines. Also in the example embodiments of this disclosure, various repositories or data stores are described as containing particular information. In other embodiments, the information used by system 200 is distributed or aggregated in different arrangements of one or more repositories or data stores. For example, one or more facility protocols may be stored in a facility repository that associates one or more caller identification values with protocol information, or the one or more protocols may instead be stored in a protocol repository that is separate from a facility repository that stores identification information associated with one or more facilities.

Inmate messaging and calling computer 206 facilitates increasing reliability in communication between one or more inmate clients 202 and one or more outsider clients 204 without increasing complexity of one or more inmate clients 202, inmate telephone systems (for example, correctional facility telephone computer 118), or outsider clients 204. Inmate messaging and calling computer 206 facilitates such improvements to ITS components or technologies in ways that are unconventional, non-routine, and not-well-known generally and especially in the industry, such as the industry of ITS. For example, system 200 distributes control or computations to one or more independent computers, such as inmate messaging and calling computer 206, that are external to and independent from correctional facility systems. By distributing control or computations, inmate messaging and calling computer 206 improves communication reliability by facilitating either an inmate client or an outsider client leaving or retrieving one or more messages even if the other of the inmate client (or the associated ITS) or the outsider client (or the associated service provider) is offline or experiencing a technical malfunction. In contrast, as explained in the Background of the Invention, prior approaches to improving the inmate calling experience typically focused on changing the telephone systems in the correctional facilities. The conventional approach therefore places complexity and computational expense burdens on the ITS in correctional facilities. Moreover, a conventional ITS precludes inmates from leaving or retrieving messages because the conventional ITS requires an outsider to accept the call by pressing one or more buttons to initiate transmittal of one or more tones (for example, dual-tone multi-frequency ("DTMF") signaling).

Figure 3:
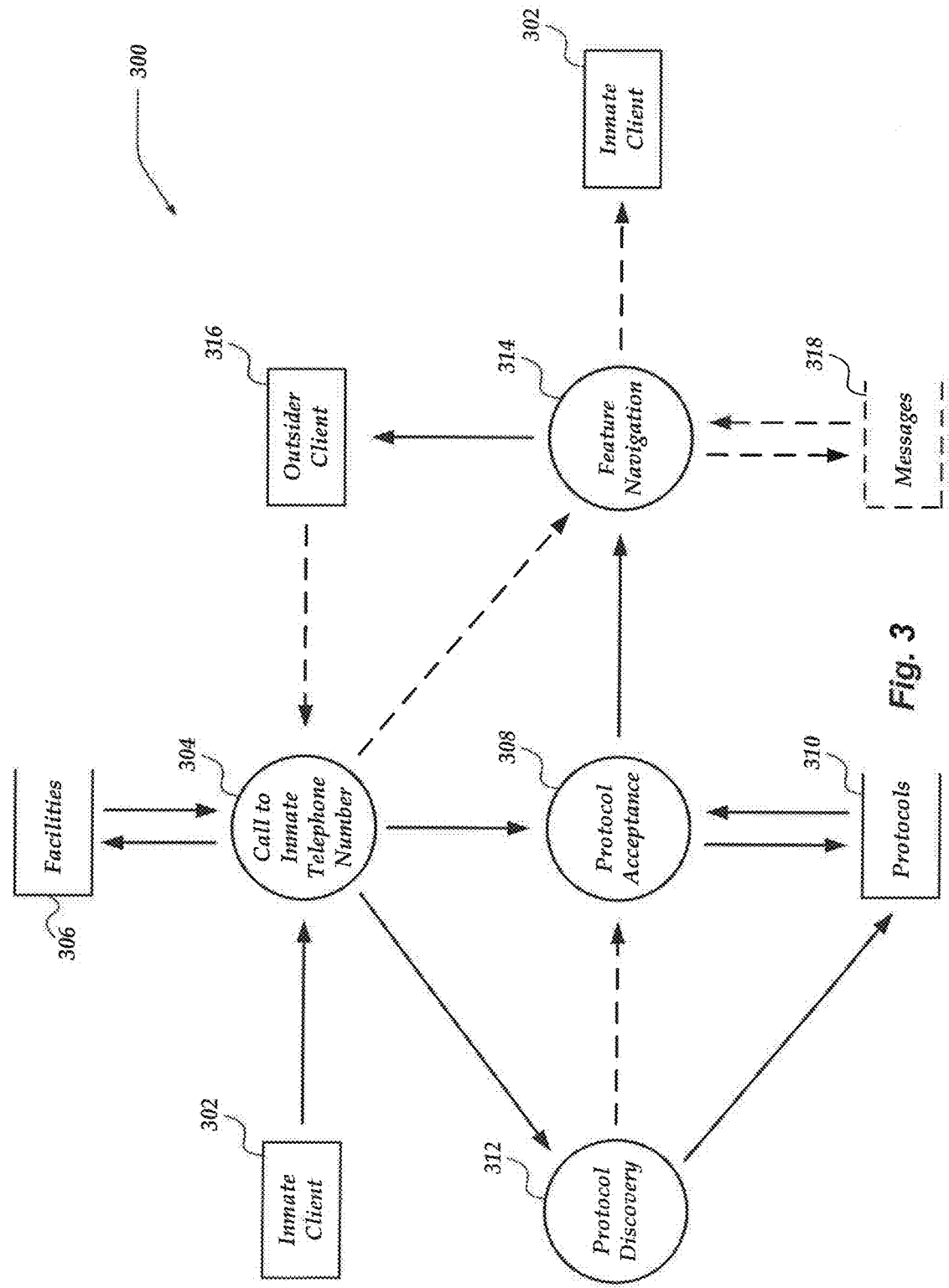
FIG. 3 illustrates an example data flow diagram for dynamically connecting inmates and outsiders.

FIG. 3 illustrates an example data flow diagram for dynamically connecting inmates and outsiders. In FIG. 3, the data flow diagram uses Yourdon/Coad notation, showing how data flows between components of an example inmate messaging and calling system, such as system 100 or system 200. In FIG. 3, the enclosed rectangles represent entities outside of an inmate messaging and calling computer, such as inmate messaging and calling computer 120 or inmate messaging and calling computer 206. For example, the external entities may send or receive data to or from the inmate messaging and calling computer and may be the sources or destinations of information entering or leaving the inmate messaging and calling computer. The external entities may also be referred to as terminators, sources, sinks, or actors. The circles represent processes. For example, each process may change data and may produce an output. In some examples, each process performs computations, sorts data based on logic, or directs the data flow based on rules. The rectangles having an open right side represent data repositories. For example, the data repositories may include files or stores that hold information for later use, such as a database table or a membership form. The arrows represent data flow. For example, each arrow may represent the route that data takes between entities, processes, or data repositories. Each arrow portrays the interface between components. Optional elements of FIG. 3 are shown with dashed lines.

As shown in FIG. 3, an inmate using inmate client 302 (for example, correctional facility telephone 114 or correctional facility telephone 116) initiates the data flow by placing a telephone call directed to a telephone number assigned to the inmate. The next path in the data flow is selected in process 304. In process 304, an inmate messaging and calling computer, such as inmate messaging and calling computer 120 or inmate messaging and calling computer 206, determines whether the incoming call is from a correctional facility that employs a protocol that is known to the inmate messaging and calling computer. In some examples, the inmate messaging and calling computer examines session initiation protocol ("SIP") information, such as SIP header information in one or more SIP header fields, associated with the incoming call to identify the source of the incoming call by comparing the examined information against information in one or more repositories, such as facility repository 306 (for example, one or more data stores 216 in message and call service repository 214).

Preferably, if the inmate messaging and calling computer determines that the source of the incoming call is a correctional facility that is known by the inmate messaging and calling computer to employ a protocol that is known to the inmate messaging and calling computer, the inmate messaging and calling computer executes protocol acceptance process 308. In process 308, the inmate messaging and calling computer looks up the protocol associated with the source correctional facility in one or more repositories, such as protocols repository 310 (for example, one or more data stores 216 in message and call service repository 214), based on the SIP information associated with the incoming call. The inmate messaging and calling computer simulates an outside client answering and accepting the incoming call by answering the call and executing an acceptance routine obtained from the one or more repositories, thereby communicating to the ITS that the incoming call has been accepted.

Preferably, if the inmate messaging and calling computer determines that the source of the incoming call is a correctional facility that is not known by the inmate messaging and calling computer to employ a protocol that is known to the inmate messaging and calling computer, the inmate messaging and calling computer executes protocol discovery process 312. In process 312, the inmate messaging and calling computer answers the call and records audio transmitted by the source of the call. In some examples, the inmate messaging and calling computer performs speech recognition or speech-to-text, extracts instruction information from the recorded audio, parses the extracted instruction information, generates protocol information based on the parsed instruction information, and stores the generated protocol information in the one or more repositories in association with identifying information associated with the source of the call. In other examples, the inmate messaging and calling computer provides the recorded audio to another agent, such as a human, that analyzes the recorded audio to learn the protocol of the source of the call and that provides protocol information to the one or more repositories in association with identifying information associated with the source of the call. Preferably, the messaging and calling computer provides the agent with a user interface that includes one or more fields in which the agent can input one or more values associated with a facility protocol message captured in the audio recording. In some examples, the inmate messaging and calling computer ends the call (for example, once the audio has been recorded). In other examples, the data flow advances to protocol acceptance process 308 to communicate to the ITS that the incoming call has been accepted based on the discovered protocol.

Figure 7:
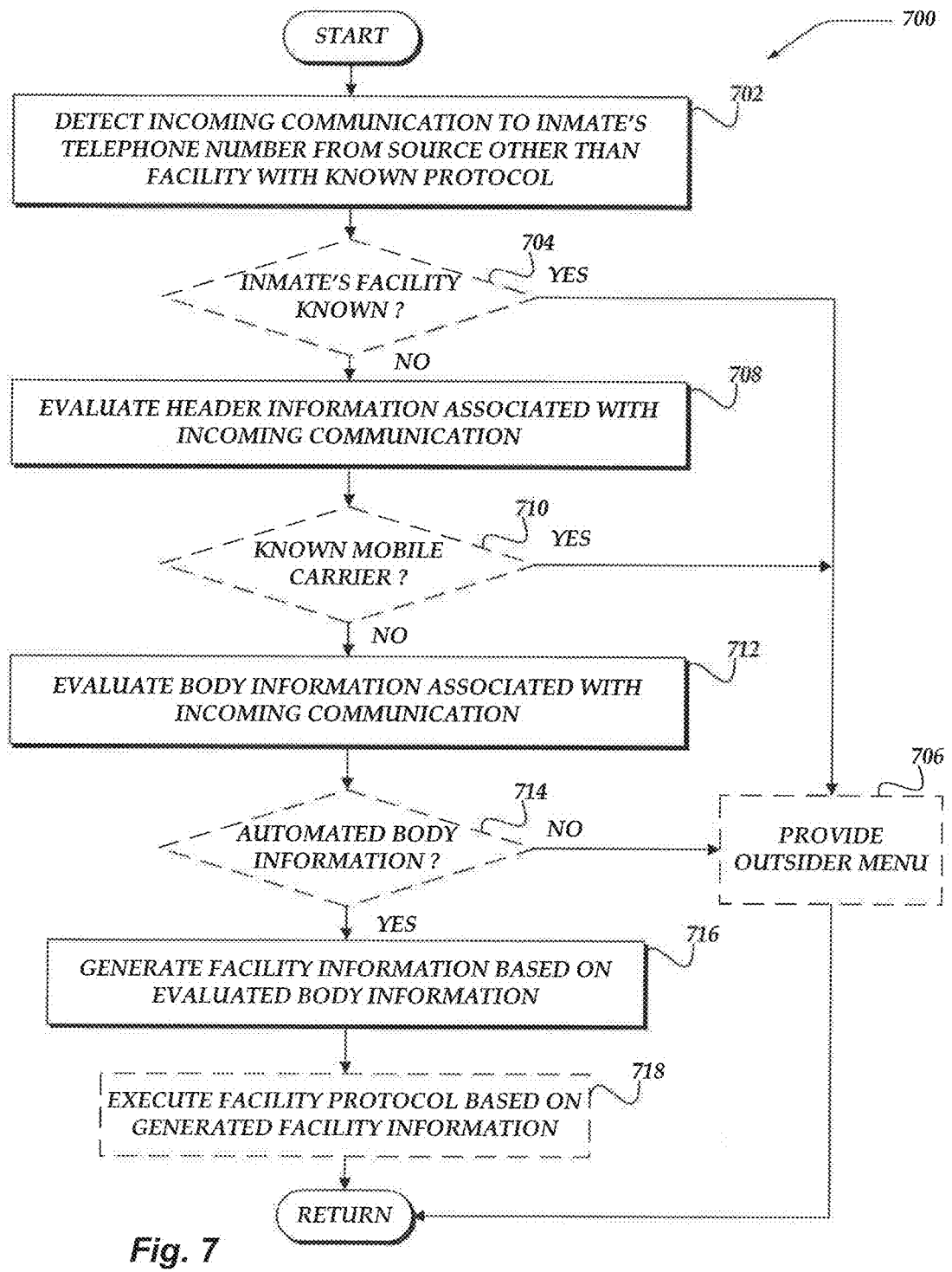
FIG. 7 illustrates a logical flowchart of an example process for generating facility information.

In some examples, if the inmate messaging and calling computer determines that the source of the incoming call is not a correctional facility that is known by the inmate messaging and calling computer to employ a protocol that is known to the inmate messaging and calling computer (for example, as discussed further regarding FIG. 7, the source is determined to not be a known correctional facility and also determined to not be associated with a known mobile carrier or a mobile virtual network operator ("MVNO")), the inmate messaging and calling computer executes protocol discovery process 312 and feature navigation process 314 for outsiders (process 314 is further discussed below) in parallel. The messaging and calling computer preferably generates a potential facility data model or data object in a facility repository or data store, starts recording audio transmitted by the source of the call, answers the call, and provides an IVR navigational menu for outsiders. In some examples, the messaging and calling computer populates a field in the potential facility data model or object with a value that indicates a quantity of valid DTMF tones that the messaging and calling computer detected during the audio recording. In some examples, if the value meets or exceeds a predetermined threshold (for example, a threshold value of one), the messaging and calling computer determines that the source is an outsider, not a correctional facility. Responsive to determining that the source is an outsider, the messaging and calling computer preferably deletes the generated potential facility data model or object and terminates the discovery process 312. In some examples, if it is determined that the source is still potentially a correctional facility (for example, no DTMF tones have been detected within a predetermined amount of time since answering the call), the messaging and calling computer provides the potential facility data model or object, preferably including the recorded audio or transcription of the recorded audio, to one or more agents, such as one or more customer service operators. In some examples, the one or more agents review the recording and, if the one or more operators determine that the source is a facility, generate a correctional facility data model or object with one or more values that define the acceptance protocol of the correctional facility. The potential facility data model or object is preferably deleted after review by the one or more agents. In some examples, executing process 312 and process 314 facilitates reducing the number of marketing or spam robocalls because the outsider IVR navigational menu sounds like an answering machine, thereby causing marketing or spam robocallers to hang up and reducing computational expenses of the messaging and calling computer.

In some examples, once the incoming call has been accepted based on execution of protocol acceptance process 308, the inmate messaging and calling computer executes feature navigation process 314. In process 314, the inmate messaging and calling computer provides the inmate using inmate client 302 the ability to provide instructions, such as voice instructions or DTMF instructions. In some examples, the inmate messaging and calling computer employs IVR to provide auditory instructions to inmate client 302 for voice or DTMF commands to select one or more options. In some example embodiments of this disclosure, one or more functions, processes, or actions are described in conjunction with an inmate pressing one or more touch buttons to transmit one or more corresponding DTMF tones. In other embodiments, the functions, processes, or actions take place responsive to the inmate providing voice commands instead of the described DTMF tones or commands. For example, some correctional facilities preclude inmates from employing DTMF tones. Accordingly, in each instance where an example embodiment describes inmates as providing DTMF tones, commands, instructions, or others, other example embodiments include similar functions, processes, or actions, differing in that the other examples embodiment employ voice commands instead of DTMF tones, commands, instructions, or others.

In some implementations, the inmate messaging and calling computer calls an outsider that uses outsider client 316 (for example, one or more of client computers 102-108 or outsider clients 204). In some examples, the inmate messaging and calling computer determines whether the outsider answers the call. If the inmate messaging and calling computer detects that the outsider answers the call, the inmate messaging and calling computer connects inmate client 302 to outsider client 316 to allow the inmate and the outsider to communicate. If the inmate messaging and calling computer detects that the outsider fails to answer the call, the inmate messaging and calling computer preferably prompts the inmate to leave a message and stores the message in one or more repositories, such as repository 318 (for example, one or more data stores 216 in message and call service repository 214). In some examples, the inmate messaging and calling computer determines that the call to the outsider fails if the call is not accepted or answered within a predetermined amount of time or before detecting a particular event (for example, a voicemail answering message), and, responsive to detecting that the call failed, the inmate messaging and calling computer returns to the navigational menus. In other examples, the inmate messaging and calling computer provides the inmate with the option to return to the navigational menus at any time by speaking one or more predetermined commands, and the inmate can opt to return to the menu if the outsider fails to answer the call.

In some examples, the inmate messaging and calling computer facilitates further feature navigation after connecting inmate client 302 and outsider client 316 to each other. For example, the inmate messaging and calling computer may detect that the inmate pressed one or more predetermined touch buttons to transmit one or more predetermined DTMF tones and, responsive to the one or more tones, may end the call with outsider client 316 to provide the inmate with further options, such as calling another outsider, retrieving one or more messages, or leaving one or more messages. In some examples, instead of detecting DTMF tones provided by the inmate, the inmate messaging and calling computer detects that the inmate spoke the term "disconnect" and, responsive to detecting the term "disconnect," ends the call with outsider client 316 to provide the inmate with the further options. In other examples, the inmate messaging and calling computer provides the inmate with the further options based on detection of outsider client 316 terminating the call.

Preferably, the inmate messaging and calling computer accepts calls to the inmate's telephone number from outsider clients. In process 304, if the inmate messaging and calling computer determines that the source of the incoming call is an outsider (for example, not a correctional facility), the inmate messaging and calling computer executes feature navigation process 314. In some examples, the inmate messaging and calling computer determines that the source of the incoming call is not a correctional facility based on analysis or identification of SIP information (for example, SIP header information) that indicates that the source of the incoming call is associated with a wireless communications service provider. In other examples, the inmate messaging and calling computer determines that the source of the incoming call is not a correctional facility after answering the incoming call based on a failure to detect automated instruction information.

In process 314, the inmate messaging and calling computer preferably provides the outsider with the option to retrieve one or more messages that the inmate left for the outsider and, based upon a received instruction from the outsider client (for example, one or more voice or DTMF signals), transmits the one or more messages from the one or more repositories to outsider client 316. In some examples, in process 314, the inmate messaging and calling computer provides the outsider with the ability to leave one or more messages for the inmate to retrieve later.

Accordingly, the data flow 300 of the inmate messaging and calling computer facilitates increasing reliability in communication between inmate client 302 and outsider client 316 by providing dynamic communication between inmate client 302 and outsider client 316 regardless of whether one of inmate client 302 (or the associated ITS) or outsider client 316 (or the associated service provider) is offline or experiencing a technical malfunction. Moreover, the data flow 300 of the inmate messaging and calling computer facilitates such technical improvements without increasing complexity of inmate client 302, inmate telephone systems (for example, correctional facility telephone computer 118), or outsider client 316.

Figure 4:
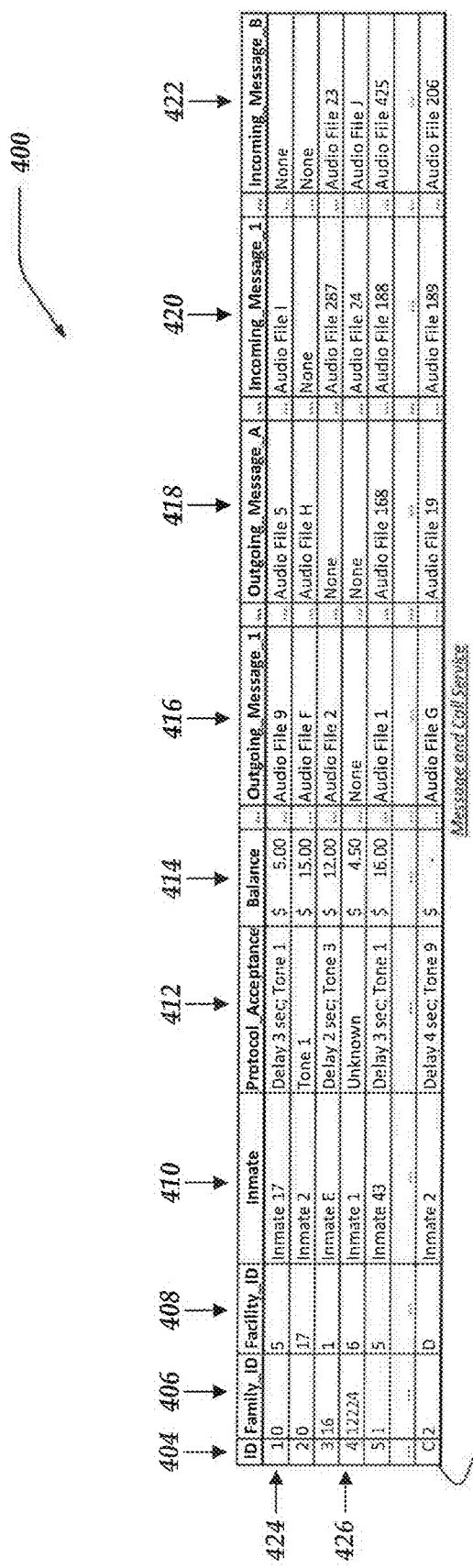
FIG. 4 shows a logical representation of a portion of an example data model that may be employed to dynamically connect inmates and outsiders.

FIG. 4 shows a logical representation of a portion of example data model 400 that may be employed by system 200 to dynamically connect inmates and outsiders. In some examples, data model 400 includes one or more data objects (for example, records or others) that represent message and calling services provided to inmates or outsiders associated with or identified in message and call service repository 214 or one or more data stores 216. In some examples, data model 400 includes a number of named attributes, such as ID 404, Family_ID 406, Facility_ID 408, Inmate 410, Protocol_Acceptance 412, Balance 414, Outgoing_Message_1 416, Outgoing_Message_A 418, Incoming_Message_1 420, Incoming_Message_B 422, or others. For each data object, the values for identifiers, such as those shown as entries for attribute 404 or others may be sequential numbers, non-sequential numbers, strings, or others. In the example shown in FIG. 4, each data object may be defined or characterized by one or more values associated with the named attributes. For example, data object 424 with ID of one has Facility_ID of five, Inmate of Inmate_17, and a balance of $5.00.

In some examples, if data model 400 involve hierarchies (for example, trees or others), nested data models or objects, or other relationships, Family_ID values associated with attribute 406 may reference ID values associated with attribute 404 or others. Accordingly, in some examples, data model 400 is self-referential, thereby facilitating querying and providing information associated with relationships between multiple message and call services without referencing a further data model that includes data objects that represent relationships. Examples of relationships may include being associated with the same or related correctional facilities, the same balance source, the same accept protocol, one or more of the same favorite or stored outsider contact phone numbers, the same geographic territory, or others.

In the example shown in FIG. 4, data object 424 represents a message and call service that is associated with Inmate_17, who is incarcerated at a correctional facility with a Facility_ID of five, which has an acceptance protocol of tone one after a delay of three seconds. In contrast, in the example shown in FIG. 4, data object 426 with ID of four is associated with Inmate 1, who is incarcerated at a correctional facility with a Facility_ID of six, which has an unknown acceptance protocol (for example, an inmate messaging and calling computer will need to discover the acceptance protocol of facility six in the future). Accordingly, in some examples, data object represents a message and call service that is in the same family as message and call service with ID 12224.

In other examples, data model 400 includes different named attributes, such as Account, Message, Facility, Number, or others. Preferably, one or more values associated with the Account attribute include one or more of the phone number associated by the messaging and calling computer with the inmate, the last known facility to house the inmate, the account balance associated with the inmate, the phone number of the inmate's main contact, or others. In some examples, one or more values associated with the Message attribute include one or more of obtained message audio or text, telephone number of the source of the obtained message, telephone number of the target of the obtained message, or others. Preferably, the messaging and calling computer obtains the telephone number of the target from the source before or after the source provides the message. In other examples, the messaging and calling computer identifies the target based on the source providing the message as a response to another message that the target previously provided for the source. In some examples, the messaging and calling computer associates the target telephone number with the message and provides access to the message to an entity that the messaging and calling computer determines to be calling from the associated telephone number based on SIP header information. Other manners of determining that a source is an identified target of a message are also envisaged. In some examples, one or more values associated with the Facility attribute include one or more of a correctional facility's caller identification provided in SIP header information when the source of an incoming telephone call is the facility, a delay prescribed by the facility's acceptance protocol prior to providing an accept DTMF tone, one or more DTMF tones prescribed by the facility's acceptance protocol, name of the correctional facility, or others. Preferably, one or more values associated with the Number attribute include a telephone number of one or more of the inmate's contacts, a mobile carrier or MVNO associated with the telephone number, a flag that indicates whether the telephone number can receive short message service ("SMS") messages, a flag that indicates whether the telephone number is known to be associated with an outsider, or others.

In some examples, data model 400 includes one or more data models for each type of element in a system, such as system 200. For example, data model 400 may include a data model for inmate clients, outsider clients, or others. In some examples, the data objects included in the one or more data models are the data objects employed by system 400 to i) initialize, execute, or manage one or more message or call services for one or more inmates, ii) collect or manage balances for one or more inmates or outsiders, iii) execute one or more acceptance protocols for one or more ITS of one or more correctional facilities, or iv) others. For clarity, portion 402 of data model 500 is shown using tabular format. In other examples, data sets or data objects may be arranged differently, such as using different formats, data structures, objects, or others.

Figure 5:
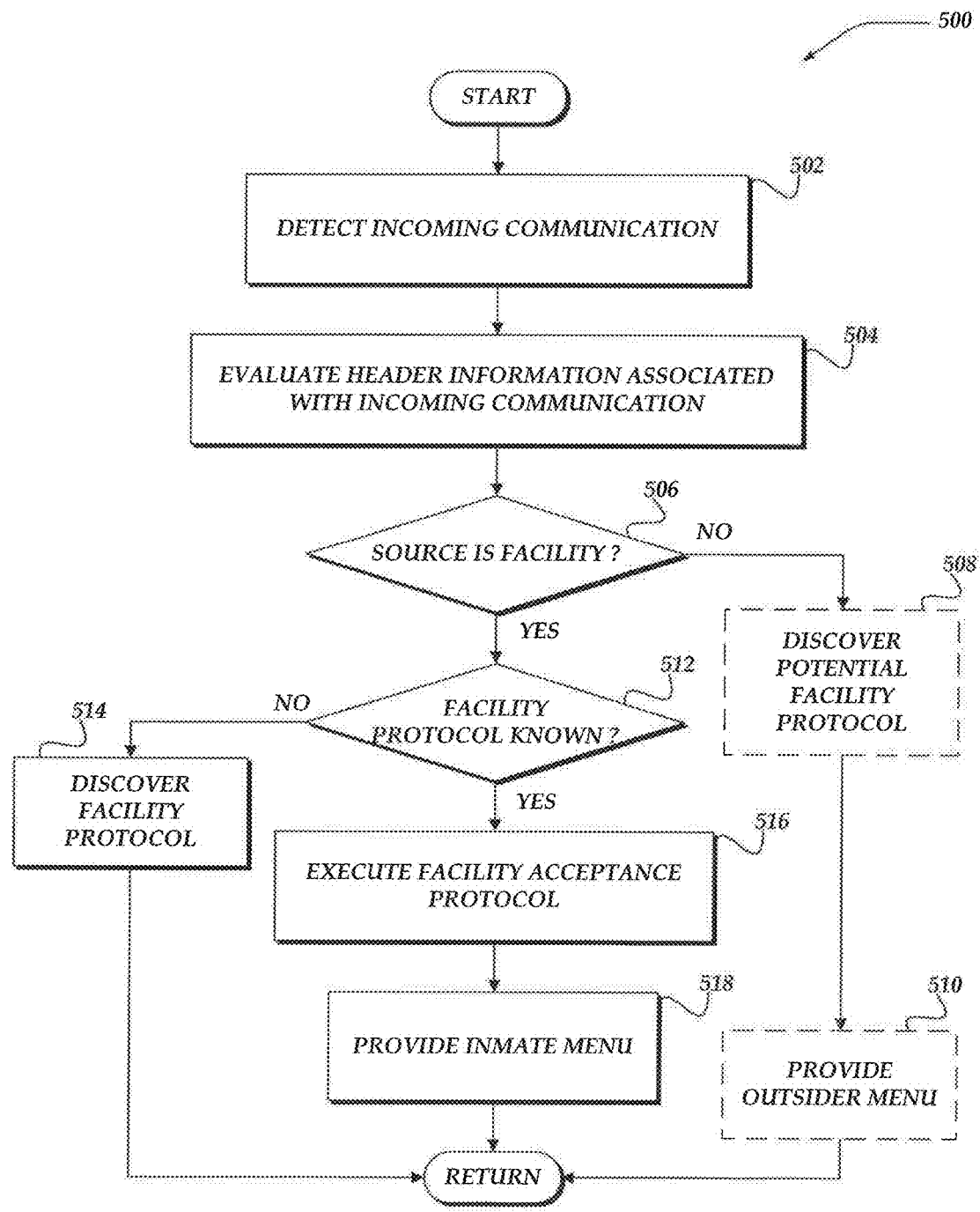
FIG. 5 illustrates an overview flowchart of an example process for dynamically connecting inmates and outsiders.

FIG. 5 illustrates an overview flowchart of example process 500 for dynamically connecting inmates and outsiders. Preferably, one or more portions of process 500 are performed by one or more inmate messaging and calling computers, such as inmate messaging and calling computer 120 or inmate messaging and calling computer 206. In some examples, one or more portions of process 500 are performed by one or more engines of the one or more inmate messaging and calling computers, such as one or more of protocol acceptance engine 208, feature navigation engine 210, or discovery engine 212. Preferably, after a start block, at block 502, an incoming communication is detected. During an onboarding process for the inmate, an inmate messaging and calling computer preferably assigns a telephone number to the inmate. In some examples, the telephone number assigned to the inmate includes a main telephone number that is unique to the inmate. In other examples, the telephone number assigned to the inmate includes a main telephone number that is generic to multiple inmates and an extension that is unique to the inmate. Accordingly, the incoming communication is preferably a telephone call to the telephone number associated with the inmate.

At block 504, the inmate messaging and calling computer preferably evaluates header information associated with the detected incoming communication. Preferably, the inmate messaging and calling computer acts as a SIP user agent (a logical network end-point) to create or receive SIP messages and, optionally, as a SIP telephone (hardware device or a softphone) to provide traditional call functions of a telephone, such as dial, answer, reject, call hold, or call transfer. Accordingly, in some examples, the inmate messaging and calling computer obtains and evaluates SIP header information associated with the detected incoming call (for example, called identification ("ID"), caller ID, or others) to determine one or more of the source of the incoming communication, the inmate information (for example, the inmate's account, the balance of the inmate's account, or others), or others.

At block 506, if the source of the incoming communication is not a correctional facility, control preferably flows to block 508; otherwise, control preferably flows to block 512. In some examples, the inmate messaging and calling computer determines that the source of the incoming communication is not a correctional facility based on the header information. For example, the messaging and calling computer may determine that the source is not a correctional facility based on the incoming communication being associated with a mobile carrier or a mobile virtual network operator ("MVNO"), such as AT&T MOBILITY, SPRINT CORPORATION, T-MOBILE US, VERIZON WIRELESS, or others. In other examples, the messaging and calling computer determines that the source is not a correctional facility based on the messaging and calling computer failing to find an identifier of the source as provided in SIP header information in the one or more repositories or data stores.

At block 508, the messaging and calling computer optionally discovers a potential facility acceptance protocol. Preferably, one or more portions of block 508 are executed in parallel to one or more portions of block 510. In some examples, the messaging and calling computer executes one or more portions of block 514 (discussed below) at block 508 to discover the potential acceptance protocol of a potential correctional facility while also providing an outsider menu at block 510 (discussed below) in case the source of the incoming communication is an outsider, not a correctional facility. Block 508 is optional because the inmate messaging and calling computer may answer the incoming communication, evaluate incoming audio associated with the answered call or speech transcription of the incoming audio, and, if the messaging and calling computer determines that the evaluated audio lacks automated recording audio, determines that the source of the incoming communication is not a correctional facility and does not proceed to discover a potential facility protocol.

At block 510, the messaging and calling computer optionally provides an outsider menu to navigate through one or more functions available to the outsider. Example functions available to the outsider include leaving one or more messages for the inmate, depositing credits or money in an account associated with the inmate, retrieving one or more messages left by the inmate, or others. Block 510 is optional because the messaging and calling computer may not provide functionality to outsiders, may restrict access to a white-listed set of outsiders, or may exclude a black-listed set of outsiders.

At block 512, the messaging and calling computer determines whether the correctional facility that is the source of the incoming communication is known by the messaging and calling computer to employ a protocol that is known to the messaging and calling computer. Preferably, the messaging and calling computer determines whether the identified source of the incoming communication is identified in one or more repositories or data stores, such as one or more data stores 216 of message and call service repository 214. In some examples, the messaging and calling computer determines whether the one or more repositories or data stores includes one or more associations between the identified source and one or more protocols. Preferably, or if the messaging and calling computer fails to find an association with the identified source and one or more protocols, control flows to block 514; otherwise, control flows to block 516.

At block 514, the messaging and calling computer discovers the protocol employed by the identified correctional facility that is the source of the incoming communication. Preferably, the messaging and calling computer answers the incoming call and records incoming audio associated with the call. In some examples, the messaging and calling computer begins recording audio prior to or at the same time as answering the call. In other examples, the messaging and calling computer answers the call and subsequently begins recording audio. The protocol is preferably discovered and its protocols defined in one or more data objects based on analysis of one or more portions of the recorded audio.

In some examples, the messaging and calling computer provides one or more selected portions of the recorded audio to one or more agents, such as user administrators or employees, who listen to the one or more selected audio portions to discover the protocol. In other examples, the messaging and calling computer converts one or more portions of the recorded audio to text. The messaging and calling computer preferably provides one or more selected portions of the generated text to one or more agents, who review the one or more selected text portions to discover the protocol. Preferably, the messaging and calling computer provides one or more user interface controls that facilitate the user providing one or more portions of one or more definitions of the discovered protocol. Examples of definition portions of a discovered protocol preferably include i) an indicator of whether the protocol requires a delay before a DTMF tone is recognized by the correctional facility, ii) an indicator of an estimated duration of the delay, iii) an indicator of whether the protocol recognizes only certain or less than all available DTMF tones as indicating acceptance of the call, iv) an indicator of one or more DTMF tones that the protocol recognizes as indicating acceptance, or v) others.

In other examples, the messaging and calling computer executes or applies one or more rules against one or more portions of the recorded audio or generated text to discover the protocol. As with each of the one or more rules described throughout this disclosure, the one or more rules preferably include one or more predefined rules or learned rules. In some examples, predetermined rules include rules that are defined by one or more files or configuration scripts. Learned rules preferably include rules discovered by the message and calling computer executing one or more artificial intelligence ("AI") algorithms (for example, one or more machine learning algorithms or others) against training text. Preferably, the messaging and calling computer generates the one or more portions of one or more definitions of the discovered protocol based on one or more outputs generated by the one or more rules.

In the example shown in FIG. 5, control flows from block 514 to an invoking process. In other examples, control flows to block 516 to execute the facility acceptance protocol based on the one or more discovered definitions of the discovered protocol during the same telephone call.

At block 516, the messaging and calling computer executes the facility acceptance protocol to accept the incoming call. Preferably, the messaging and calling computer answers the incoming call and transmits one or more signals in accordance with one or more portions of one or more definitions of the facility protocol as defined in one or more repositories associated with the messaging and calling computer. In some examples, the messaging and calling computer transmits one or more DTMF tones after one or more delays as prescribed by the one or more portions of the one or more definitions.

At block 518, the messaging and calling computer provides an inmate navigation menu. Preferably, the messaging and calling computer audibly communicates to the inmate that the inmate navigation menu facilitates the inmate selecting one or more features of the messaging and calling computer. For example, the messaging and calling computer may communicate to the inmate that i) selecting a first option enables the inmate to place one or more telephone calls to one or more outsiders, ii) selecting a second option enables the inmate to listen to or otherwise retrieve one or more messages left for the inmate, iii) selecting a third option enables the inmate to obtain a balance amount of the inmate's account, or iv) others. Preferably, the messaging and calling computer facilitates the inmate selecting one or more options by transmitting one or more DTMF tones or verbally selecting the one or more options.

Preferably, the messaging and calling computer returns to the inmate navigation menu upon completion of the messaging and calling computer providing the one or more selected features. In other examples, the messaging and calling computer transitions to one or more features based on the messaging and calling computer completing provision of the one or more selected features. For example, the messaging and calling computer may execute a feature that facilitates the inmate leaving a voicemail for an outsider based on the messaging and calling computer detecting that the inmate selected an option to place a call to the outsider and that the other inmate or the outsider did not answer the call. Next, control preferably flows to an invoking process.

Figure 6:
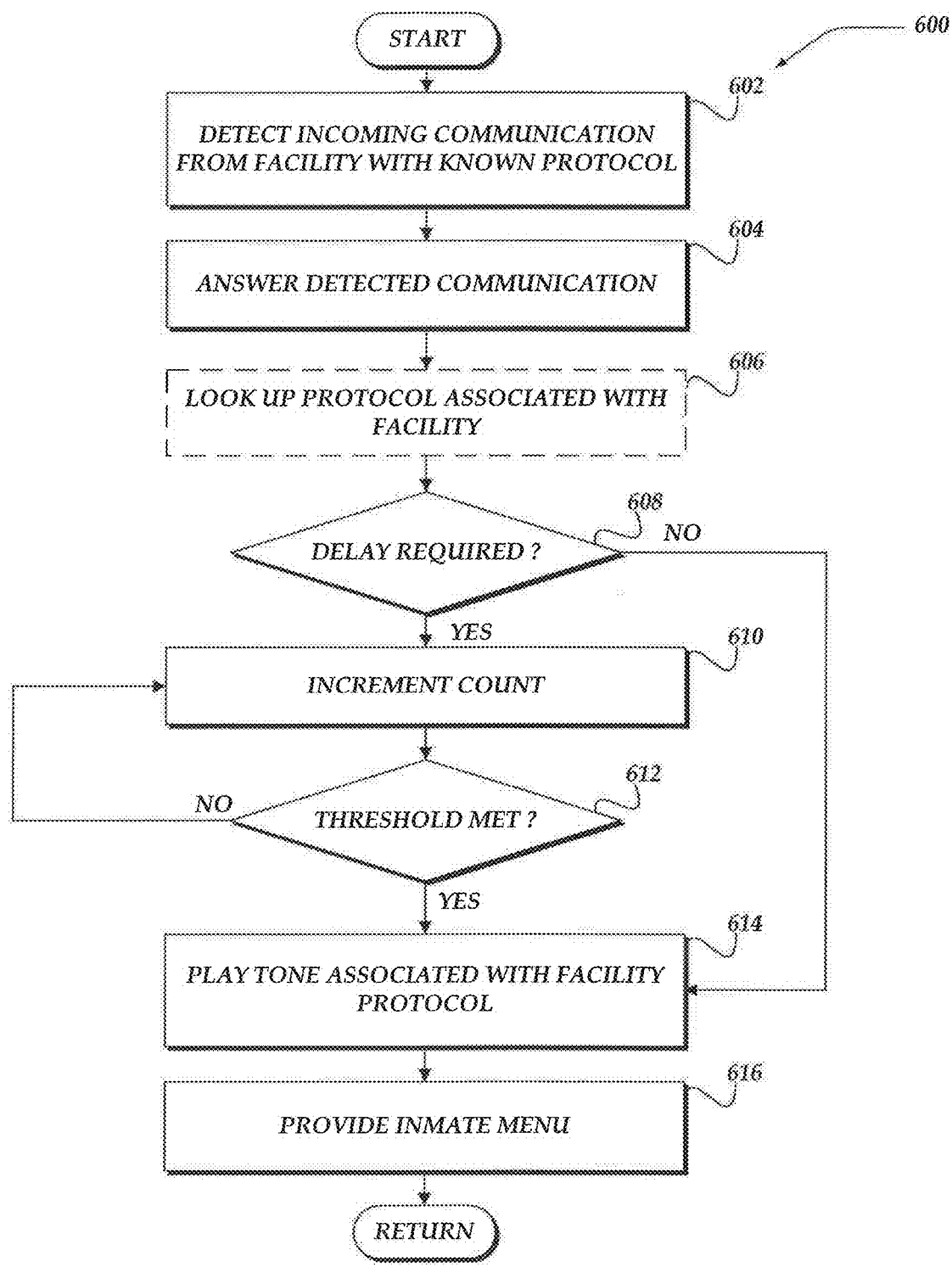
FIG. 6 shows a logical flow diagram of an example process for providing an inmate menu.

FIG. 6 shows a logical flow diagram of example process 600 for providing an inmate menu. Preferably, one or more portions of process 600 are performed by one or more inmate messaging and calling computers, such as inmate messaging and calling computer 120 or inmate messaging and calling computer 206. In some examples, one or more portions of process 600 are performed by one or more engines of the one or more inmate messaging and calling computers, such as one or more of protocol acceptance engine 208 or feature navigation engine 210. Preferably, after a start block, at block 602, a messaging and calling computer detects an incoming communication from a facility with a known protocol. In some examples, the messaging and calling computer determines that the incoming communication is directed to a telephone number associated with an inmate based on one or more portions of header information associated with the incoming communication. Preferably, the messaging and calling computer determines that the detected incoming communication is from the facility based on one or more portions of the header information, such as one or more header portions that identify a telephone number or name of the facility. In some examples, the messaging and calling computer determines that the facility employs the known protocol by looking up one or more portions of identification information associated with the facility in one or more repositories.

At block 604, the messaging and calling computer answers the detected communication. In some example, the messaging and calling computer answers the detected communication by transmitting one or more answer signals to a SIP server or the facility.

At block 606, the messaging and calling computer optionally looks up the protocol associated with the facility. Preferably, the messaging and calling computer looks up the protocol by querying one or more repositories based on one or more identifiers associated with the facility. In some examples, the messaging and calling computer obtains one or more portions of one or more data objects or models from the one or more repositories. Preferably, the one or more portions of the one or more data objects or models includes one or more indicators that identify or describe one or more characteristics or definitions of the protocol associated with the facility. Block 606 is optional because the messaging and calling computer may look up the protocol associated with the facility prior to answering the detected communication. In some examples, the actions at block 606 occur at block 602. For example, the messaging and calling computer may look up one or more portions of identification information associated with the facility and may look up the protocol associated with the facility in a single query to one or more repositories.

At block 608, if the messaging and calling computer determines that the protocol requires a delay prior to accepting the incoming communication, control preferably flows to block 610; otherwise, control preferably flows to block 614. In some examples, the messaging and calling computer determines whether the protocol requires a delay based on one or more values of the one or more obtained indicators from the one or more repositories.

At block 610, the messaging and calling computer increments a count. Preferably, the messaging and calling computer instantiates a counter variable with a value. In some examples, the initial value of the counter variable is zero, and the messaging and calling computer increments the value of the counter variable to represent passage of a predetermined amount of time. In other examples, the initial value of the counter variable is a non-zero number that represents the amount of delay required by the protocol as defined by one or more values of the one or more obtained indicators, and the messaging and calling computer decrements the value of the counter variable to represent passage of the predetermined amount of time.

At block 612, if the value of the counter value matches the value of a duration threshold, control preferably flows to block 614; otherwise, control preferably returns to block 610 to continue incrementing or decrementing the value of the counter variable. In some examples, the messaging and calling computer sets the value of the duration threshold to a non-zero number that represents the duration of the required delay. In other examples, the messaging and calling computer sets the value of the duration threshold to zero if the messaging and calling computer decrements the value of the counter variable in block 610. In some examples, blocks 610 and 612 are implemented with higher-level code as a pause command with an associated duration given in a unit of time, such as seconds.

At block 614, the messaging and calling computer transmits one or more signals that represent one or more DTMF tones that comply with the facility protocol to the facility to indicate that the messaging and calling computer accepts the call. Preferably, the messaging and calling computer selects the one or more DTMF tones based on one or more values of the one or more obtained indicators from the one or more repositories.

At block 616, the messaging and calling computer provides an inmate navigation menu to facilitate an inmate who initiated the incoming communication navigating the features of the messaging and calling computer. Next, control preferably returns to an invoking process.

FIG. 7 illustrates a logical flowchart of example process 700 for generating facility information. Preferably, one or more portions of process 700 are performed by one or more inmate messaging and calling computers, such as inmate messaging and calling computer 120 or inmate messaging and calling computer 206. In some examples, one or more portions of process 700 are performed by one or more engines of the one or more inmate messaging and calling computers, such as one or more of protocol acceptance engine 208 or feature navigation engine 210. Preferably, after a start block, at block 702, a messaging and calling computer detects an incoming communication to an inmate's telephone number from a source other than a facility that is known by the messaging and calling computer to employ a protocol that is known to the messaging and calling computer. In some examples, the messaging and calling computer determines that the source is not a facility that the messaging and calling computer knows employs a known protocol based on one or more portions of one or more results provided by one or more repositories responsive to one or more queries by the messaging and calling computer. For example, the messaging and calling computer may query the one or more repositories based on one or more portions of header information associated with the incoming communication, and the one or more repositories may return one or more results that indicate that the source is not identified in the one or more repositories or that indicate that the one or more repositories lack information that identifies the protocol employed by the source.

At block 704, if the messaging and calling computer determines that the inmate's facility is known, control preferably flows to block 706; otherwise, control preferably flows to block 708. Block 704 is optional because the messaging and calling computer may not employ knowledge of the inmate's facility as an indicating characteristic of whether the source is an outsider. Preferably, the messaging and calling computer determines that the source is an outside caller if the inmate's facility is known because, otherwise, the messaging and calling computer would have identified the source as being the inmate's facility based on one or more portions of header information associated with the incoming communication.

At block 706, the messaging and calling computer provides an outsider navigation menu to facilitate the outsider source navigating one or more features provided by the messaging and calling computer. Block 706 is optional because the messaging and calling computer may not support features for outsiders, either generally or based on the inmate's particular account settings. Examples of features available to the outsider include i) identifying the outsider to enable features specific to the identified outsider, ii) retrieve one or more messages left by the inmate for the outsider, iii) leave one or more messages for the inmate, iv) deposit funds into one or more of the inmate's accounts, or v) others.

At block 708, the messaging and calling computer evaluates one or more portions of header information associated with the incoming communication. Preferably, the messaging and calling computer evaluates one or more portions of the header information that indicate whether the source is associated with one or more mobile carriers or MVNOs.

At block 710, if the messaging and calling computer determines that the source is associated with a known mobile carrier, control preferably flows to block 706; otherwise, control preferably flows to block 712. Block 710 is optional because the messaging and calling computer may not employ knowledge of mobile carriers as an indicating characteristic of whether the source is an outsider. Preferably, the messaging and calling computer determines that the source is an outsider if the source is associated with a known mobile carrier because correctional facilities are typically not associated with mobile carriers and, instead, employ land line telephones.

At block 712, the messaging and calling computer evaluates one or more portions of body information associated with the incoming communication. Preferably, the messaging and calling computer generates a potential facility data object, answers the incoming communication, records one or more portions of audio transmitted by the source, and populates one or more fields in the potential facility data object based on the recorded audio. In some examples, the messaging and calling computer records incoming audio for a predetermined time duration, such as two minutes starting when the messaging and calling computer answers the incoming communication.

At block 714, if the messaging and calling computer determines that the one or more evaluated portions of body information do not include automated body information, control preferably flows to block 706; otherwise, control preferably flows to block 716. Block 714 is optional because the messaging and calling computer may not employ detection of automated body information as an indicating characteristic of whether the source is an outsider. In some examples, automated body information includes automated voice messages or instructions that a correctional facility source transmits. Preferably, the messaging and calling computer determines that, if the source transmits automated voice instructions, the source is a correctional facility.

At block 716, the messaging and calling computer generates facility information based on the one or more evaluated portions of body information. Preferably, the messaging and calling computer records one or more portions of the automated body information to discover a protocol employed by the correctional facility source. In some examples, one or more portions of one or more of blocks 712, 714, or 716 are executed in parallel to one or more portions of block 706 to attempt to discover a potential acceptance protocol of a potential correctional facility while also providing an outsider menu at block 706 in case the source of the incoming communication is an outsider, not a correctional facility. For example, control may flow from block 710 to blocks 706 and 712 if the result of the messaging and calling computer determination is NO at block 710. Preferably, the messaging computer determines that, if one or more predetermined DTMF tones are recorded in the incoming audio, the source is not a correctional facility.

At block 718, the messaging and calling computer executes the discovered facility protocol based on the generated facility information. Block 718 is optional because the messaging and calling computer may terminate the incoming communication after recording the one or more portions of the automated body information without executing the protocol, thereby requiring the source to repeat the call after the protocol has been discovered for the messaging and calling computer to accept the call. Next, control preferably returns to an invoking process.

Figure 8:
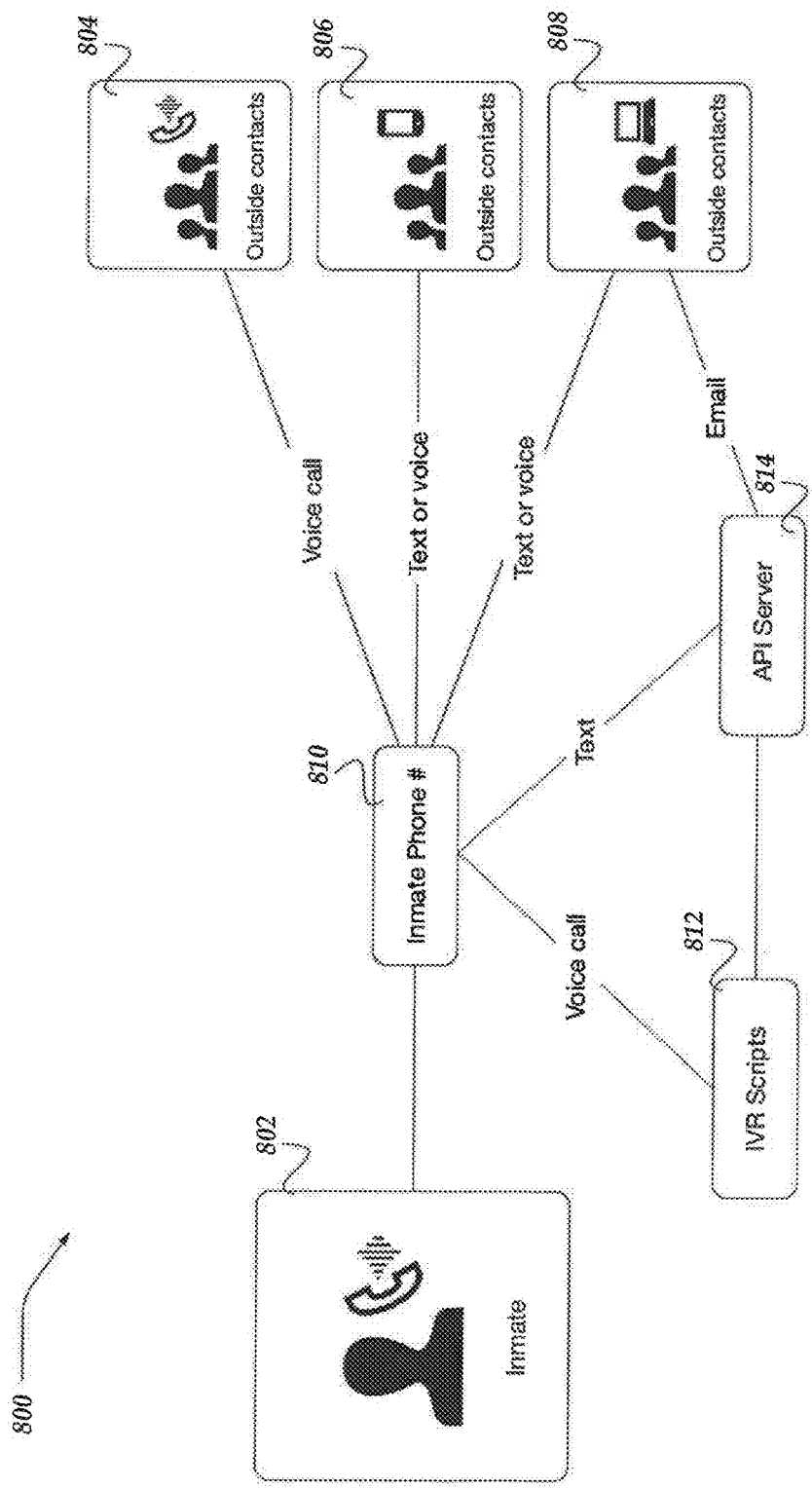
FIG. 8 is an overview data flow diagram for an example use case, including preferred actors and components.

FIG. 8 shows example overview data flow diagram 800 for an example use case, including preferred actors and components, such as the various components that comprise a preferred version of the system and the phones that connect to it.

An inmate with access to correctional facility telephone 802 resides inside a corrections facility. One or more outside contacts associated with one or more outsider telephones 804, 806, 808 reside or otherwise are positioned outside the facility. In some examples, each outside contact typically has his or her own telephone. As illustrated in FIG. 8, any of telephones 804, 806, 808 may be land line telephones, mobile telephones, personal computing devices, or others. Any of these telephones, inside or outside a facility can initiate a call by calling the inmate's assigned phone number 810. The inmate knows this assigned telephone number and uses it to access his/her messaging interface. The outsiders know this assigned telephone number and use it to access the outsiders' IVR messaging interface. Outsiders can also send SMS texts to the inmate's telephone number, or send emails to an email address associated with the inmate's phone number, rather than recording audio over the telephone.

Calling the inmate's number connects the calling party with an IVR system, represented in FIG. 8 as one or more scripts 812 running on an IVR server. This system responds to user input over the telephone (voice and/or DTMF tones) and reads from and writes to an application programming interface ("API") server 814 where various data are stored, including account information, facility information, caller information and caller messages. An outsider can also send an email to an email address associated with the inmate's phone number, which then stores a message from that outsider to the inmate's message queue via the API server.

Figure 9:
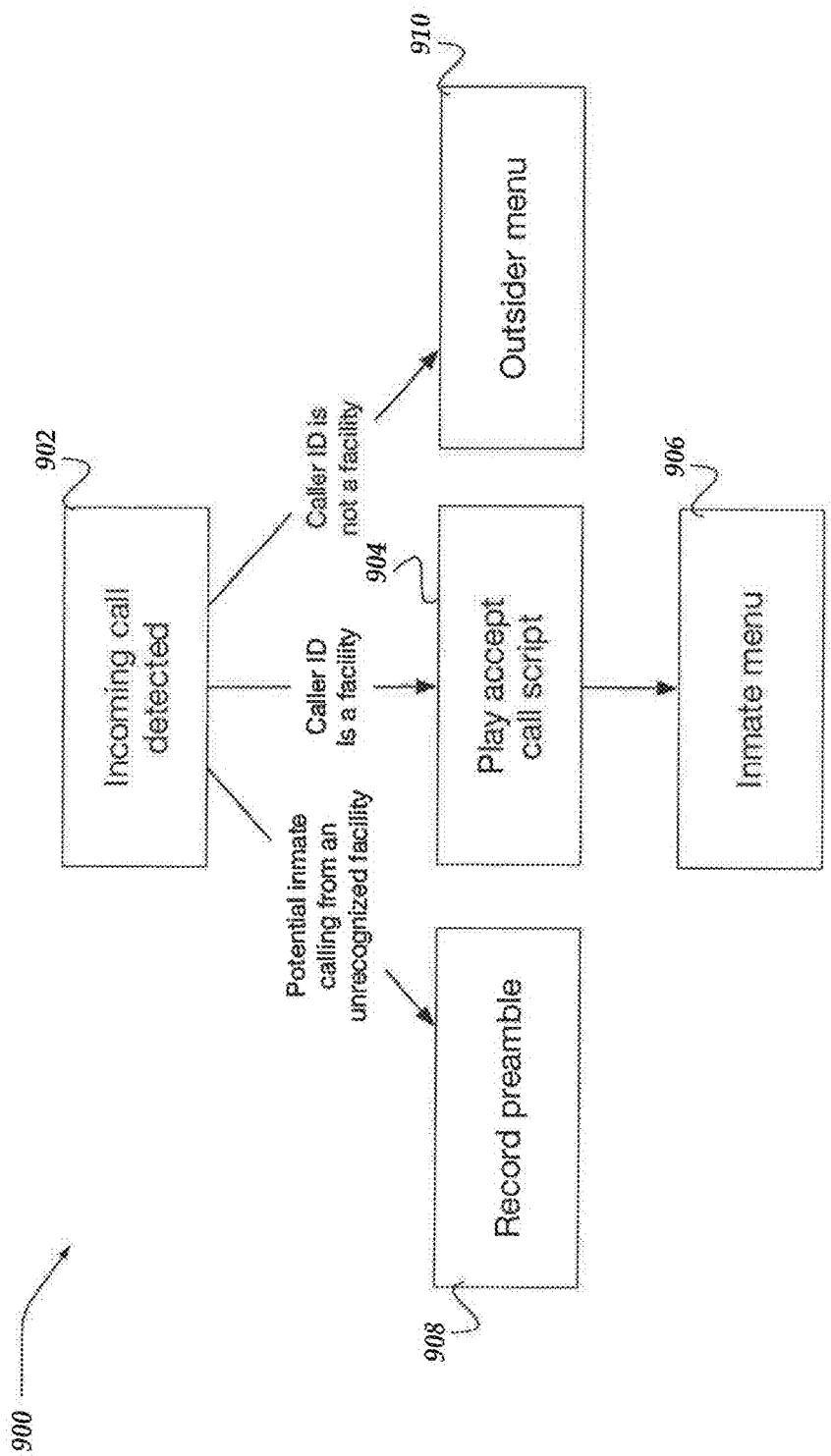
FIG. 9 is a logical flow chart for call processing in an example use case, including preferred logic engines.

A user initiates a connection to the preferred system when they call the inmate's assigned telephone number. FIG. 9 shows example logical flow chart 900 for call processing in an example use case, including preferred logic engines. Logical flow chart 900 describes the call processing flow within the system. In the described implementation, the sequence of operations begins when the incoming call starts ringing, before the call is answered, at block 902. This allows the system to acquire information from the databases regarding the type of incoming call before the IVR system answers it. This is useful because the IVR system has at least three different flows, depending on the type of call.

If the caller ID is the caller ID of a facility or an ITS provider, the call is determined to be coming from an inmate. In this case after the IVR script answers the call, it preferably follows a scripted sequence in order to accept the call, as represented by block 904. This typically involves sending one numeric DTMF tone to accept the call or another DTMF tone to reject the call. A database of known facilities is used to look up the accept call requirements for a given facility based on the incoming caller ID. Once the accept call script is completed, the inmate, for the first time during the call, is able to hear voice prompts and speak to interact with the system (for example, leave messages or employ other functions of the system). The IVR script then plays the insider menu, as represented by block 906.

If the caller ID is an unknown number and the current location of the inmate associated with the incoming assigned telephone number is unknown, then the caller is potentially an inmate calling from an unknown facility. In this case, the system preferably looks up the telephone provider of the incoming caller ID to determine whether the incoming telephone number is a mobile number or a landline number. If it's a landline number, then the call is preferably recorded, a new potential facility data object is saved in a data store, and notifications can be sent to customer service, alerting them that a new preamble is being or has been recorded, represented at block 908. The preamble will usually be an automated message, of the format: "You are receiving a call from an inmate at King County Jail. Press 1 to accept this call or press 2 to reject this call." The recording can be reviewed by customer service live or later, and the script to send the 1 DTMF tone at the appropriate time can be associated in the database with the caller ID of the new facility. In the future, calls from this facility's caller ID will be recognized and accepted. Once the potential facility data object is saved and a call recording is initiated, block 910 is executed in case an outside caller is calling from a non-mobile carrier.

If neither of the above conditions is true, then the system preferably assumes that the incoming call is from an outsider. When the call is answered, the caller will have immediate access to the outsider menu, represented at block 910.

Once a user is connected to either the insider menu or the outsider menu, the system functions as a tailored automated voicemail system. However, there are important differences that relate to restrictions on inmate communication and the fact that each inmate telephone number provides access to messages left for the caller and the ability to leave messages.

Figure 10:
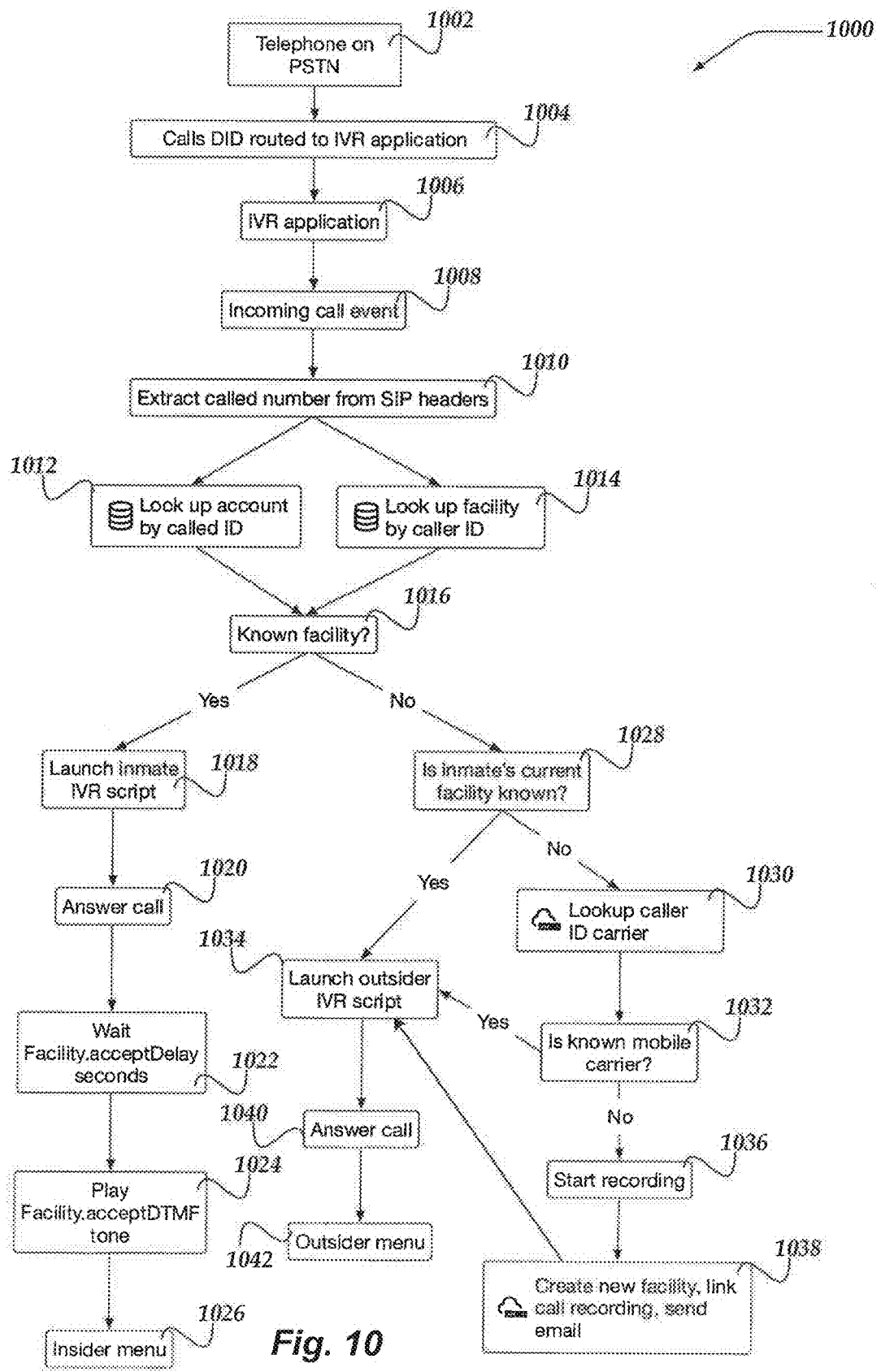
FIG. 10 is a logical flow chart for call answering in an example use case, including preferred logic for handling calls associated with known and unknown facilities.

FIG. 10 shows example logical flow chart 1000 for call answering in an example use case, including preferred logic for handling calls associated with known and unknown facilities. This process is unique to the invention and is what allows both inmates and outsiders to connect to the system.

A user calls an inmate's number with a telephone on a public switched telephone network ("PSTN") at block 1002. A direct inward dial ("DID") telephone number is preferably purchased for the inmate, and the call is routed via SIP to the IVR application that handles the calls at block 1004. This triggers an IVR script to process the call at block 1006.

The script receives an incoming call event when the number starts ringing before the call is picked up at block 1008. The script preferably evaluates two phone numbers: the called ID and the caller ID. The script preferably extracts these from the SIP headers from the incoming connection at block 1010.

Next, the script uses the caller ID and the called ID to do two database lookups. The script preferably uses the called ID to determine which of the inmates' telephone numbers is being called at block 1012 and preferably uses the caller ID to look up a facility at block 1014.

In some cases, if the caller ID is the caller ID of a known facility, the script preferably determines that the call comes from an inmate, and the inmate IVR script is executed at block 1018. The inmate IVR script preferably answers the call at block 1020 and uses one or more fields from the facility object retrieved from the database to determine how to accept the incoming call. A delay field, facility.acceptDelay, is preferably used by the script at block 1022 to determine how long to wait before sending a DTMF tone to accept the call. A field, facility.acceptDTMF, is preferably evaluated by the script at block 1024 to determine whether the field contains the numeric DTMF tone that should be played following the delay to accept the call. Once the DTMF tone has been played, the inmate is connected to the IVR system, and the inmate main menu script is executed by the script at block 1026. From this point, the inmate can use voice commands to navigate the menus.

In other cases, if the caller ID is not the caller ID of a known facility, the script preferably determines whether the inmate record from the database shows that the location of the inmate is known or not known at block 1028. In the case with a new account, the call could be from an inmate in a facility that is not yet known in the database, and the script preferably determines that the location of the inmate is not known. At this stage in the process, the call could still be coming from an outsider, so the preferred implementation uses a cloud service at block 1030 to determine the carrier of the caller ID. If it is a mobile carrier, then an outsider is calling and not a facility, and the script preferably branches at block 1032 to the outsider script at block 1034. If the caller ID is a landline or an unknown carrier, the script determines that the call may be originated by an inmate calling from a facility not in the database. In this case, the script preferably begins recording the call at block 1036. If it is a new facility, a preamble with directions to accept the call will be played and recorded by the script after the call is answered at block 1040 while an outsider menu is provided at block 1042. The script preferably sends a message to the API server at block 1038 to create a new potential facility data object for the incoming caller ID. The API server preferably adds the audio recording to that facility data object and sends an email to customer support so that they can review the recording. Preferably one or more portions of one or more of block 1036 or block 1038 are executed in parallel to one or more portions of one or more of block 1034, block 1040, or block 1042.

If the recording is a facility preamble, customer support or the script sets the acceptDelay and acceptDTMF properties on the facility and mark it as reviewed.

If the recording is not a facility, customer support or the script stores an entry in the numbers database marking this caller ID as an outsider. Next time someone calls from that number, the caller will hear the outsider menu instead of having their call recorded.

In some cases, the caller ID is not the caller ID of a known facility and the inmate record shows that the location of the inmate is known, and the script branches to the outsider script at block 1034. The outsider script then picks up the call at block 1044 and plays the outsider main menu at block 1046.

Figure 11:
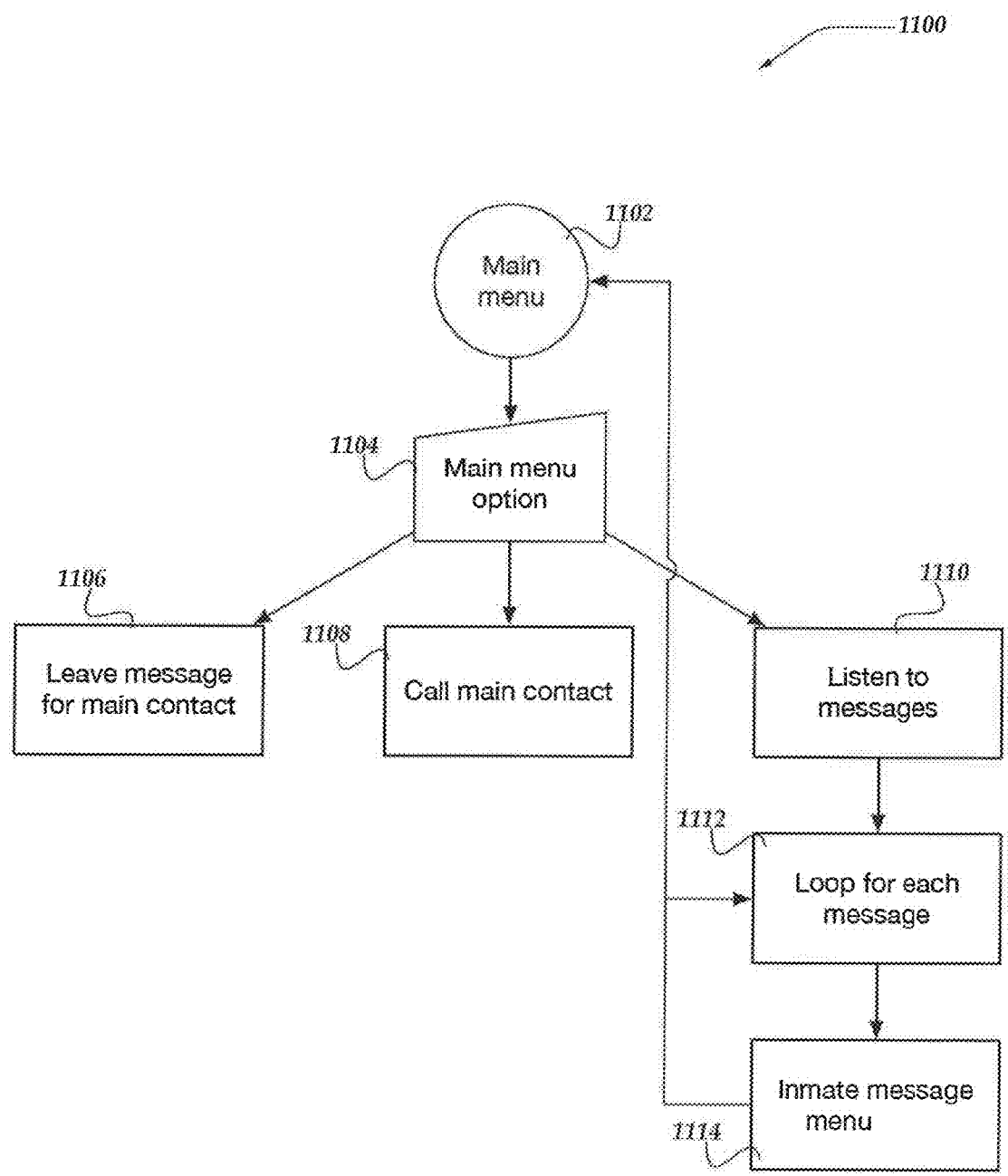
FIG. 11 is a logical flow diagram for an inmate main menu in an example use case, including a preferred logic block for calling contacts.

FIG. 11 shows example logical flow diagram 1100 for an inmate main menu in an example use case, including a preferred logic block for calling contacts. The user hears a series of menu options at block 1104 and chooses one using voice commands at block 1104. Numeric DTMF tones are not usually allowed on inmate phone systems, so all IVR interaction preferably use voice commands for compatibility. This restriction preferably only applies to the inmate version of the IVR scripts.

Two of the options are shortcuts for contacting the inmate's main contact. This is typically the outsider who set up the account and is responsible for billing. The first shortcut facilitates the inmate leaving a message for the main contact at block 1106. The second shortcut facilitates the inmate calling the main contact at block 1108.

Figure 12:
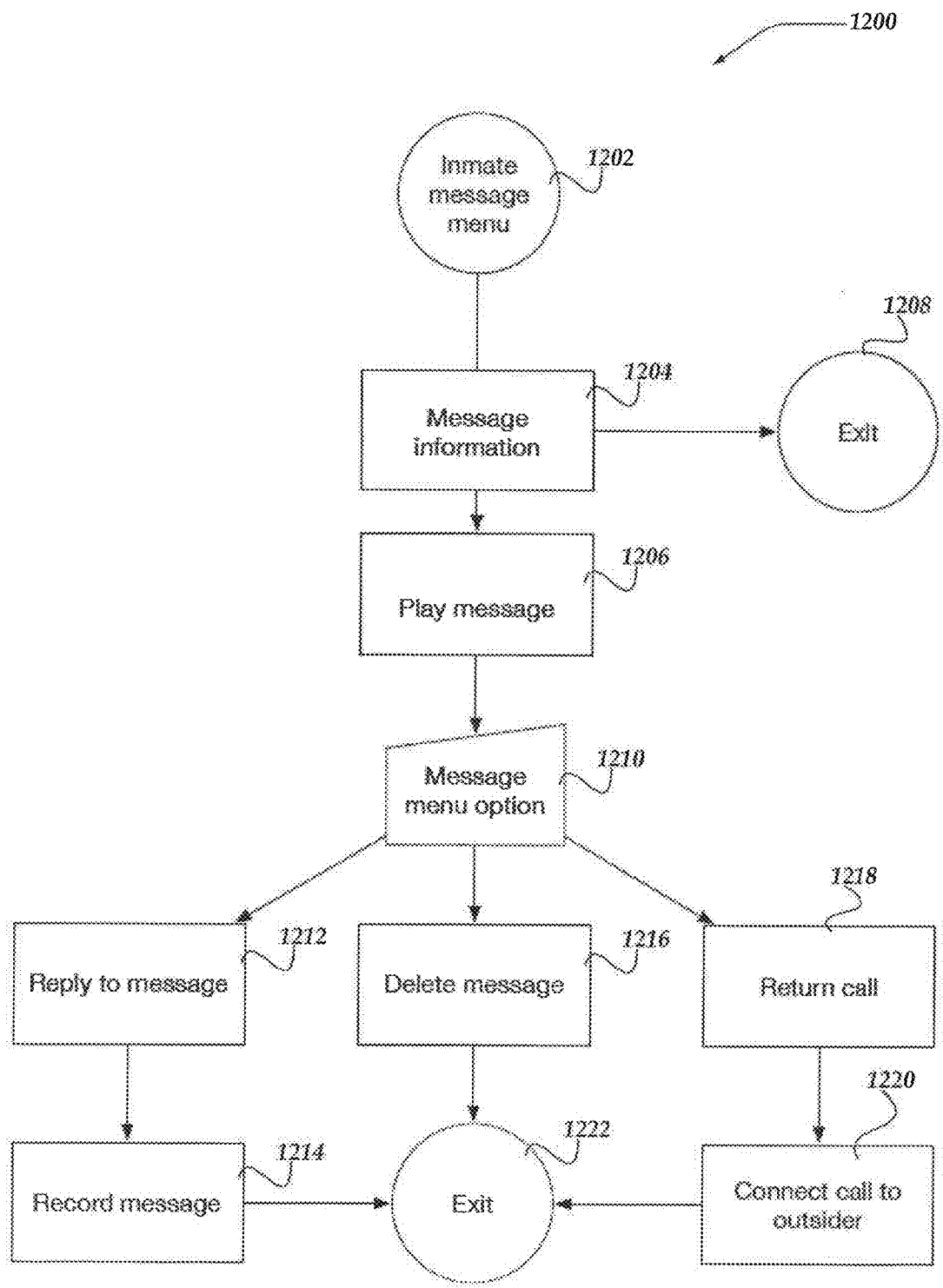
FIG. 12 is a logical flow diagram for an inmate message menu in an example use case, including preferred logic for connecting an inmate to an outsider.

The third option is to listen to messages at block 1110. After choosing this option, the user's message list is downloaded from the API, and the user can navigate through their messages, listen to them, and reply to them at block 1112. At block 1114, the script preferably returns to an inmate message navigation menu to facilitate the inmate selecting another one or more message functions. For example, a message is provided for each message at block 1114 to facilitate the inmate looping through blocks 1112 and 1114 for each message or optionally returning to the main menu at block 1102. FIG. 12 shows an example of the logic associated with blocks 1112 and 1114.

FIG. 12 shows example logical flow diagram 1200 for an inmate message menu in an example use case, including preferred logic for connecting an inmate to an outsider. In some examples, the process facilitates interaction by the inmate with a single message. First, the flow to present the inmate with an inmate message menu to select a message to review begins at block 1202. At block 1204, the inmate hears information about the message, including the date that it was recorded, the type of message (SMS text, voice, email, or support), or others. They then have message options, such as an option of listening to the message at block 1206 or exiting the message menu for this message and returning to block 1112 to select the next message.

If they choose to listen to the message, they will either hear audio recorded by the outsider, or in the case of email and SMS messages, the message will be read to them using text-to-speech (TTS) technology at block 1206.

After listening to a message they have a number of options related to that message at block 1210. They can reply to it at block 1212, recording a message for the outsider at block 1214, they can perform message management at block 1216, such as deleting the message or navigating to other messages, or they can return the call to the number that left the message at block 1218. Returning the call is preferably only allowed if the outsider has authorized it. If the script determines that a return call is authorized, the script connects the call to the outsider at block 1220. At block 1222, control preferably returns to block 1112 in FIG. 11 to select the next message.

Figure 13:
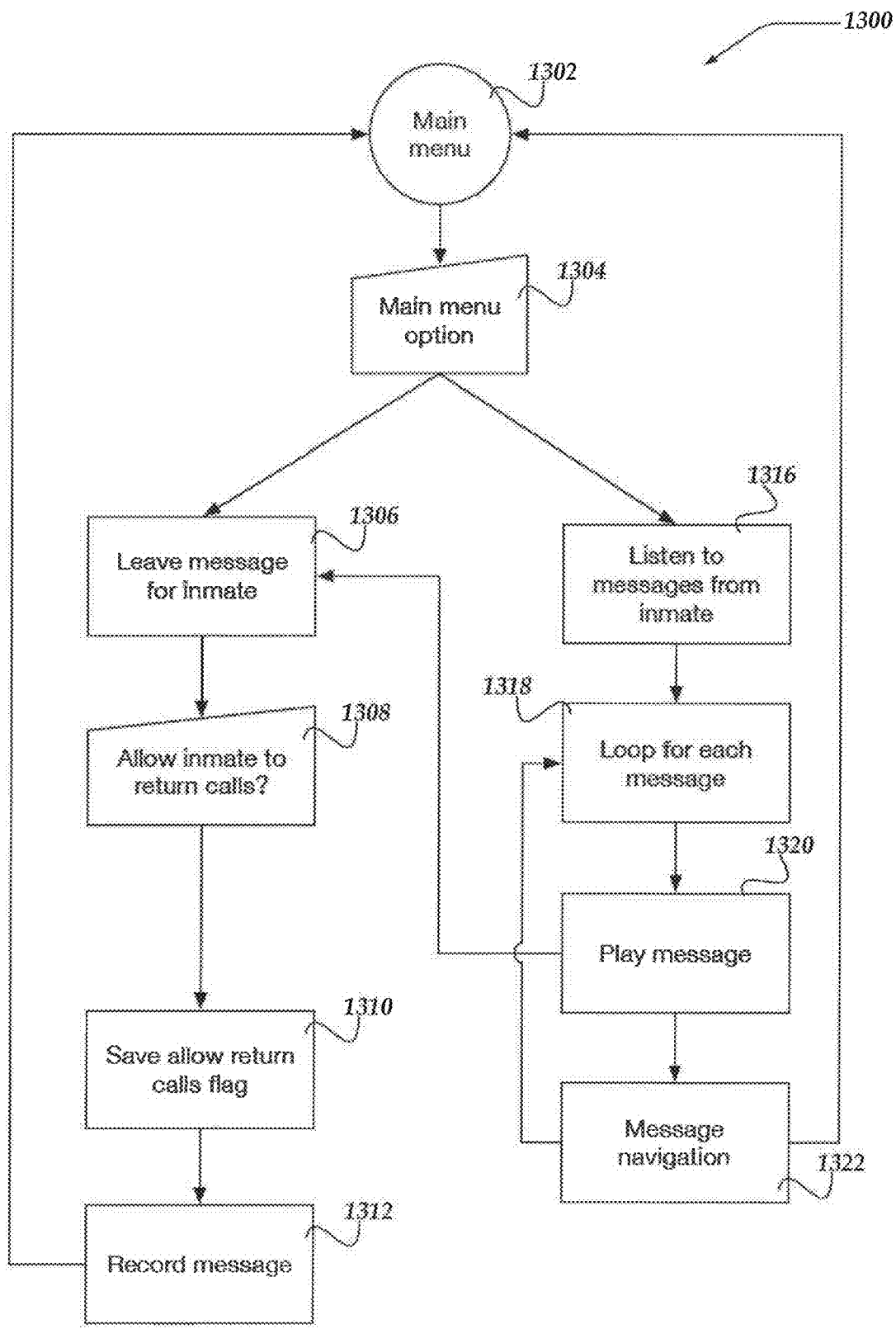
FIG. 13 is a logical flow chart for an outsider main menu in an example use case, including preferred logic for allowing or disallowing return calls from an inmate.

FIG. 13 shows example logical flow chart 1300 for an outsider main menu in an example use case, including preferred logic for allowing or disallowing return calls from an inmate. In contrast to the insider menu, the outsider uses touch-tone DTMF tones for selecting menu options at block 1302.

They have a list of messages from the inmate that they can listen to, and they can record messages to the inmate. These options are selectable menu options, and the selection is preferably made at block 1304.

At block 1306, the outsider selects the option to leave a message for the inmate. For security purposes and to avoid harassment, when the outsider records a message to the inmate, they are asked whether they would like to permit the inmate to return calls or send return messages to them at block 1308. If they answer no, then the inmate will be able to hear the messages from the outsider, but the inmate will not be able to return calls or messages. If they answer yes, then the inmate is able to leave messages or return calls. Preferably, the script sets a flag that indicates the outsider's authorization choice for the inmate to return calls at block 1310. At block 1312, the outsider is able to record the message.

The system addresses security by preferably only allowing two ways for the inmate to contact outsiders. Either by calling their main contact, who has previously authorized the inmate's calls, or by replying to messages. Replying to messages is safe because they can reply in two ways: by leaving a return message or by returning a call to the outsider who left the message.

Preferably, the only way an outsider will ever hear a return message is if they have previously left the inmate a message (so that they can choose to reply to that message) and if the user then calls the inmate's number and chooses to listen to messages from the inmate. This is clearly consensual.

Returning a call to the outsider who left the message is also consensual because this option is only available when the outsider has left a message and explicitly agreed to allow return calls.

Preferably, the user selects an option to listen to messages from the inmate at block 1316. The script preferably loops through each message at block 1318 and plays user-selected messages at block 1320. At block 1322, the script facilitates the user navigating message options, such as delete, save, or others. Next, control preferably returns to an invoking process.

The order of one or more portions of one or more blocks can be arranged in any order that facilitates achieving one or more of the features, advantages, or goals of one or more of the example embodiments described in this disclosure. One or more portions of one or more blocks may run in parallel to one or more portions of one or more other blocks without limitation, so long as one or more of the features, advantages, or goals of one or more of the example embodiments described in this disclosure are achieved. Other changes can additionally or alternatively be made to the example embodiments without departing from the scope and spirit of the invention. For example, in some embodiments, inmates may be replaced with medical patients (for example, mental health patients) in a medical facility (for example, a mental health facility), and correctional facilities may be replaced with medical facilities (for example, mental health facilities).

Throughout the specification and claims, the following terms take the meanings explicitly associated herein, unless the context clearly dictates otherwise. The phrase "in some examples" or "in other examples" as used herein does not necessarily refer to the same embodiment or implementation, though it may. Thus, as described above, various embodiments or implementations may be readily combined, without departing from the scope or spirit of the invention.

In addition, as used herein, the term "or" is an inclusive "or" operator and is equivalent to the term "or," unless the context clearly dictates otherwise. The term "based on" is not exclusive and allows for being based on additional factors not described, unless the context clearly dictates otherwise. In addition, throughout the specification, the meaning of "a," "an," and "the" include plural references. Also, throughout the specification, plural references are intended to also disclose the singular, unless the context clearly dictates otherwise. Also, throughout the specification, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

The invention claimed is:

1. A communication processing system for allowing inmates to leave messages for non-inmates, comprising:
   a computer system having a processor, the computer system being communicatively coupled to a telephone system and configured to receive incoming telephone calls;
   a memory communicatively coupled to the processor, the memory storing instructions that, when executed by the processor, cause the processor to perform one or more actions, the actions comprising:
      associating a telephone number with an inmate at a correctional facility;
      detecting a first incoming communication from a first source directed to the telephone number, the first incoming communication having header information and body information;
      determining that the first source of the first incoming communication is the correctional facility based on one or more portions of the header information or the body information of the first incoming communication;
      determining a protocol employed by the correctional facility based on one or more portions of the header information or the body information of the first incoming communication;
      transmitting an audible signal to accept the first incoming communication, the audible signal being selected based on the determined protocol;
      obtaining a message from the inmate to a non-inmate via the accepted first incoming communication; and
      transmitting a notification of the obtained message to a client device of the non-inmate.

2. The communication processing system of claim 1, wherein the actions further comprise:
   detecting a second incoming communication from a second source directed to the telephone number, the second incoming communication having header information;
   determining that the second source of the second incoming communication is the non-inmate; and
   providing the obtained message from the inmate to the non-inmate via the second incoming communication.

3. The communication processing system of claim 1, wherein the actions further comprise:
   detecting a second incoming communication from a second source directed to the telephone number, the second incoming communication having header information;
   determining that the second source of the second incoming communication is another non-inmate;
   obtaining a message from the other non-inmate to the inmate via the second incoming communication; and
   providing the obtained message from the other non-inmate to the inmate via the first incoming communication.

4. The communication processing system of claim 1, wherein the actions further comprise connecting the inmate to a client device of another non-inmate via the first incoming communication.

5. The communication processing system of claim 1, wherein determining a protocol employed by the correctional facility comprises:
   detecting a second incoming communication directed to the telephone number before detecting the first incoming communication, the second incoming communication having header information;
   answering the second incoming communication;
   recording one or more portions of audio obtained in the second incoming communication to discover the protocol employed by the correctional facility based on evaluation of the one or more recorded portions of obtained audio; and
   generating or modifying one or more data objects to indicate that the correctional facility employs the discovered protocol.

6. The communication processing system of claim 1, wherein the actions further comprise:
   detecting a second incoming communication from a second source directed to the telephone number, the second incoming communication having header information;
   evaluating the header information of the second incoming communication to determine that the second source is associated with a mobile carrier;
   determining that the second source is a non-correctional facility source based on the determination that the second source is associated with a mobile carrier; and
   obtaining a message from the non-correctional facility source to the inmate via the second incoming communication based on the determination that the second source is the non-correctional facility source.

7. The communication processing system of claim 1, wherein the actions further comprise:
   detecting a second incoming communication from a second source directed to the telephone number, the second incoming communication having header information;
   evaluating the header information of the second incoming communication to determine that the second source has a telephone number that is different than a telephone number of the correctional facility;
   determining that the second source is a non-correctional facility source based on the determination that the second source has the telephone number that is different than the telephone number of the correctional facility; and
   obtaining a message from the non-correctional facility source to the inmate via the second incoming communication based on the determination that the second source is the non-correctional facility source.

8. The communication processing system of claim 1, wherein the audible signal includes an audible tone.

9. The communication processing system of claim 1, wherein transmitting the notification of the obtained message to the client device of the non-inmate comprises transmitting a uniform resource identifier ("URI") to the client device of the non-inmate, the URI identifying a file generated based on the obtained message and providing the non-inmate access to the file to facilitate the non-inmate consuming content in the obtained message.

10. A method for allowing inmates to leave messages for non-inmates, the method being performed by one or more processors in a network computer that is communicatively coupled to a telephone system, the method comprising:
   assigning a telephone number to an inmate at a correctional facility;
   detecting a first incoming communication from a first source directed to the telephone number, the first incoming communication having header information and body information;
   determining that the first source of the first incoming communication is the correctional facility based on one or more portions of the header information or the body information of the first incoming communication;

determining a protocol employed by the correctional facility based on one or more portions of the header information or the body information of the first incoming communication;

transmitting an audible signal to accept the first incoming communication, the audible signal being selected based on the determined protocol;

obtaining a message from the inmate to a non-inmate via the accepted first incoming communication; and transmitting a notification of the obtained message to a client device of the non-inmate.

11. The method of claim 10, further comprising:

detecting a second incoming communication from a second source directed to the telephone number, the second incoming communication having header information;

determining that the second source of the second incoming communication is the non-inmate; and providing the obtained message from the inmate to the non-inmate via the second incoming communication.

12. The method of claim 10, further comprising:

detecting a second incoming communication from a second source directed to the telephone number, the second incoming communication having header information;

determining that the second source of the second incoming communication is another non-inmate;

obtaining a message from the other non-inmate to the inmate via the second incoming communication; and providing the obtained message from the other non-inmate to the inmate via the first incoming communication.

13. The method of claim 10, further comprising connecting the inmate to a client device of another non-inmate via the first incoming communication.

14. The method of claim 10, wherein determining a protocol employed by the correctional facility comprises:

detecting a second incoming communication directed to the telephone number before detecting the first incoming communication, the second incoming communication having header information;

answering the second incoming communication;

recording one or more portions of audio obtained in the second incoming communication to discover the protocol employed by the correctional facility based on evaluation of the one or more recorded portions of obtained audio; and generating or modifying one or more data objects to indicate that the correctional facility employs the discovered protocol.

15. The method of claim 10, further comprising:

detecting a second incoming communication from a second source directed to the telephone number, the second incoming communication having header information;

evaluating the header information of the second incoming communication to determine that the second source is associated with a mobile carrier;

determining that the second source is a non-correctional facility source based on the determination that the second source is associated with a mobile carrier; and obtaining a message from the non-correctional facility source to the inmate via the second incoming communication based on the determination that the second source is the non-correctional facility source.

16. The method of claim 10, further comprising:

detecting a second incoming communication from a second source directed to the telephone number, the second incoming communication having header information;

evaluating the header information of the second incoming communication to determine that the second source has a telephone number that is different than a telephone number of the correctional facility;

determining that the second source is a non-correctional facility source based on the determination that the second source has the telephone number that is different than the telephone number of the correctional facility; and obtaining a message from the non-correctional facility source to the inmate via the second incoming communication based on the determination that the second source is the non-correctional facility source.

17. The method of claim 10, wherein the audible signal includes an audible tone.

18. The method of claim 10, wherein transmitting the notification of the obtained message to the client device of the non-inmate comprises transmitting a uniform resource identifier ("URI") to the client device of the non-inmate, the URI identifying a file generated based on the obtained message and providing the non-inmate access to the file to facilitate the non-inmate consuming content in the obtained message.

19. The communication processing system of claim 1, wherein the actions further comprise:

evaluating one or more portions of the body information of the first incoming communication to determine that the one or more evaluated portions of the body information of the first incoming communication include automated body information, wherein determining that the first source of the first incoming communication is the correctional facility is based on the one or more evaluated portions of the body information of the first incoming communication that include automated body information.

20. The communication processing system of claim 1, wherein the actions further comprise:

evaluating one or more portions of the body information of the first incoming communication to determine that the one or more evaluated portions of the body information of the first incoming communication include automated body information, wherein determining the protocol employed by the correctional facility is based on the one or more evaluated portions of the body information of the first incoming communication that include automated body information.

* * * * *